US010519398B1

(12) United States Patent
Lee

(10) Patent No.: US 10,519,398 B1
(45) Date of Patent: Dec. 31, 2019

(54) METHODS FOR PRODUCING A HIGH PROTEIN CORN MEAL FROM A WHOLE STILLAGE BYPRODUCT AND SYSTEM THEREFORE

(71) Applicant: Fluid Quip, Inc., Springfield, OH (US)

(72) Inventor: Chie Ying Lee, San Jose, CA (US)

(73) Assignee: Fluid Quip, Inc., Springfield, OH (US)

( * ) Notice: Subject to any disclaimer, the term of this patent is extended or adjusted under 35 U.S.C. 154(b) by 0 days.

(21) Appl. No.: 16/543,829

(22) Filed: Aug. 19, 2019

Related U.S. Application Data

(60) Continuation of application No. 16/390,302, filed on Apr. 22, 2019, which is a continuation of application
(Continued)

(51) Int. Cl.
*A23K 10/38* (2016.01)
*C11B 13/00* (2006.01)
(Continued)

(52) U.S. Cl.
CPC .............. *C11B 13/00* (2013.01); *A23K 10/38* (2016.05); *A23K 50/00* (2016.05); *A23L 7/198* (2016.08);
(Continued)

(58) Field of Classification Search
CPC ....... A23L 1/1041; A23K 1/06; A23K 1/1833; A23V 2002/00; B02C 9/04;
(Continued)

(56) References Cited

U.S. PATENT DOCUMENTS 4,361,651 A    11/1982   Keim
4,624,805 A    11/1986   Lawhon
(Continued)

FOREIGN PATENT DOCUMENTS

CN      1242879 C     2/2006
EP      0395556 A1   10/1990
(Continued)

OTHER PUBLICATIONS

Internation Search Report issued in International Patent Application No. PCT/US2009/045163, 12 pages.
(Continued)

*Primary Examiner* — Patrick Orme
(74) *Attorney, Agent, or Firm* — Wood Herron & Evans LLP

(57) ABSTRACT

The present invention relates generally to corn dry-milling, and more specifically, to methods for producing a high protein corn meal from a whole stillage byproduct produced in a corn dry-milling process for making ethanol and a system therefore. In one embodiment, a method for producing a high protein corn meal from a whole stillage byproduct includes, in a corn dry-milling process for making ethanol, separating the whole stillage byproduct into an insoluble solids portion and a thin stillage portion. The thin stillage portion is separated into a protein portion and a water soluble solids portion. Next, the protein portion is dewatered then dried to define a high protein corn meal that includes at least 40 wt % protein on a dry basis.

26 Claims, 10 Drawing Sheets

Related U.S. Application Data

No. 15/691,040, filed on Aug. 30, 2017, now Pat. No. 10,266,790, which is a continuation of application No. 14/632,359, filed on Feb. 26, 2015, now Pat. No. 10,160,932, which is a continuation of application No. 14/330,612, filed on Jul. 14, 2014, now Pat. No. 10,233,404, which is a division of application No. 13/321,670, filed as application No. PCT/US2009/045163 on May 26, 2009, now Pat. No. 8,778,433.

(51) Int. Cl.

| | | |
|---|---|---|
| B04B 3/04 | (2006.01) | |
| A23L 7/10 | (2016.01) | |
| A23K 50/00 | (2016.01) | |
| C12F 3/10 | (2006.01) | |
| B04B 5/10 | (2006.01) | |
| B02C 9/04 | (2006.01) | |
| B04B 1/20 | (2006.01) | |

(52) U.S. Cl.
CPC .......... *B02C 9/04* (2013.01); *B04B 3/04* (2013.01); *B04B 5/10* (2013.01); *C12F 3/10* (2013.01); *A23V 2002/00* (2013.01); *B04B 2001/205* (2013.01); *Y02P 60/873* (2015.11); *Y02W 30/74* (2015.05)

(58) Field of Classification Search
CPC ..... B04B 2001/205; B04B 5/10; C11B 13/00; C12F 3/10; Y02P 60/873; Y02W 30/74
See application file for complete search history.

(56) References Cited

U.S. PATENT DOCUMENTS

| | | |
|---|---|---|
| 5,066,498 A | 11/1991 | McCauley, III |
| 5,177,008 A | 1/1993 | Kampen |
| 5,250,182 A | 10/1993 | Bento et al. |
| 5,662,810 A | 9/1997 | Willgohs |
| 5,958,233 A | 9/1999 | Willgohs |
| 6,071,378 A | 6/2000 | Saito |
| 6,095,065 A | 8/2000 | Dietrich, Sr. |
| 6,509,180 B1 | 1/2003 | Verser et al. |
| 6,634,508 B1 | 10/2003 | Ishigaki |
| 6,962,722 B2 | 11/2005 | Dawley et al. |
| 7,101,691 B2 | 9/2006 | Kinley et al. |
| 7,351,559 B2 | 4/2008 | Verser et al. |
| 7,494,675 B2 | 2/2009 | Abbas et al. |
| 7,601,858 B2 | 10/2009 | Cantrell et al. |
| 7,608,729 B2 | 10/2009 | Winsness et al. |
| 7,829,680 B1 | 11/2010 | Sander et al. |
| 8,008,516 B2 | 8/2011 | Cantrell et al. |
| 8,008,517 B2 | 8/2011 | Cantrell et al. |
| 8,103,385 B2 | 1/2012 | Macharia et al. |
| 8,168,037 B2 | 5/2012 | Winsness |
| 8,257,951 B2 | 9/2012 | Prevost et al. |
| 8,283,484 B2 | 10/2012 | Cantrell et al. |
| 8,679,353 B2 | 3/2014 | Winsness |
| 8,679,793 B2 | 3/2014 | Lewis |
| 8,722,911 B2 | 5/2014 | Bleyer et al. |
| 8,778,433 B2 | 7/2014 | Lee |
| 8,906,204 B2 | 12/2014 | Xu |
| 8,956,460 B2 | 2/2015 | Ahmed et al. |
| 8,986,551 B2 | 3/2015 | Kohl et al. |
| 9,029,126 B2 | 5/2015 | Bleyer et al. |
| 9,066,531 B2 | 6/2015 | Williams |
| 2003/0180415 A1 | 9/2003 | Stiefel et al. |
| 2004/0082044 A1 | 4/2004 | Prevost et al. |
| 2004/0087808 A1 | 5/2004 | Prevost et al. |
| 2006/0006116 A1 | 1/2006 | Scheimann et al. |
| 2006/0041153 A1 | 2/2006 | Cantrell et al. |
| 2006/0057251 A1 | 3/2006 | Dawley et al. |
| 2006/0071378 A1 | 4/2006 | Brown |
| 2006/0091050 A1 | 5/2006 | Hwang |
| 2006/0173169 A1 | 8/2006 | Cheryan |
| 2006/0194296 A1 | 8/2006 | Hammond et al. |
| 2007/0039853 A1 | 2/2007 | Angulo Aramburu |
| 2007/0254089 A1 | 11/2007 | Hickey et al. |
| 2008/0026101 A1 | 1/2008 | Nickel et al. |
| 2008/0044547 A1 | 2/2008 | DeLine et al. |
| 2008/0095890 A1 | 4/2008 | Watson |
| 2008/0110577 A1* | 5/2008 | Winsness ............... B01D 3/002 159/5 |
| 2008/0299632 A1 | 12/2008 | Winsness et al. |
| 2009/0029432 A1 | 1/2009 | Abbas et al. |
| 2009/0130257 A1 | 5/2009 | Abbas et al. |
| 2009/0250412 A1 | 10/2009 | Winsness et al. |
| 2009/0259060 A1 | 10/2009 | Cantrell et al. |
| 2010/0004474 A1 | 1/2010 | Cantrell et al. |
| 2010/0260918 A1 | 10/2010 | Wang et al. |
| 2012/0121565 A1 | 5/2012 | Williams |
| 2012/0205324 A1 | 8/2012 | Cantrell et al. |
| 2012/0312905 A1 | 12/2012 | Claycamp |
| 2013/0164795 A1 | 6/2013 | Lowe et al. |
| 2014/0053829 A1 | 2/2014 | Lee |
| 2014/0142282 A1 | 5/2014 | Emanuele et al. |
| 2014/0147897 A1 | 5/2014 | Lee |
| 2014/0212543 A1 | 7/2014 | Lywood et al. |
| 2014/0220650 A1 | 8/2014 | Woods et al. |
| 2014/0242251 A1 | 8/2014 | Bootsma |
| 2014/0319066 A1 | 10/2014 | LoCascio et al. |
| 2014/0343259 A1 | 11/2014 | Bleyer et al. |
| 2015/0010975 A1 | 1/2015 | Burlew et al. |
| 2015/0056327 A1 | 2/2015 | Redford |
| 2015/0060259 A1 | 3/2015 | Xu |
| 2015/0064308 A1 | 3/2015 | Williams |
| 2015/0068058 A1 | 3/2015 | Buettner et al. |
| 2015/0080203 A1 | 3/2015 | Martyniuk |

FOREIGN PATENT DOCUMENTS

| | | |
|---|---|---|
| EP | 0636692 A1 | 2/1995 |
| EP | 1988169 A1 | 11/2008 |
| WO | 8606098 A1 | 10/1986 |
| WO | 2010109203 A1 | 9/2010 |
| WO | 201414683 A1 | 1/2014 |
| WO | 201426947 A1 | 2/2014 |
| WO | 201433476 A2 | 3/2014 |

OTHER PUBLICATIONS

Patent Office of the Republic of China, Office Action and Search Report issued in corresponding Chinese Patent Application No. 200980159557.7 and English-language translation, dated Nov. 12, 2012 (22 pages).

Patent Office of Republic of China, Second Office Action issued in corresponding Chinese Patent Application No. 2009801595577 and English-language translation dated Sep. 27, 2013 (19 pages).

Patent Office of Republic of China, Decision of Rejection issued in corresponding Chinese Patent Application No. 200980159557.7 and English-language translation, dated Apr. 18, 2014 (21 pages).

Zhang et al, "DDGS Production Technology, Research and Utilization Satus and Application in Livestock and Poultry Production," Animals Breeding and Feed, Issue 10, pp. 38-42 (7 pages).

United States Patent and Trademark Office, Non-final Office Action issued in corresponding U.S. Appl. No. 13/321,670 (dated Oct. 4, 2013) (22 pages).

United States Patent and Trademark Office, Notice of Allowance issued in corresponding U.S. Appl. No. 13/321,670 (dated Mar. 12, 2014) (7 pages).

Canadian Intellectual Property Office, Requisition by Examiner issued in corresponding Canadian Patent Application No. 2,763,467, dated Jul. 8, 2015.

Canadian Patent Office, Notice of Allowance issued in corresponding Canadian Patent Application No. 2,763,467 dated Mar. 10, 2016.

State Intellectual Property Office of the Peoples Republic of China, Notification of Re-Examination issued in corresponding Chinese Patent Application No. 200980159557.7 and English-language translation dated Apr. 13, 2016.

(56) References Cited

OTHER PUBLICATIONS

United States Patent and Trademark Office, Office Action issued in U.S. Appl. No. 14/632,359 dated Oct. 6, 2016, 43 pages.
United Stated Patent and Trademark Office, Office Action issued in U.S. Appl. No. 14/789,550 dated Oct. 7, 2016, 39 pages.
United States Patent and Trademark Office, Office Action issued in U.S. Appl. No. 14/330,612 dated Sep. 30, 2016, 36 pages.
U.S. Patent and Trademark Office, Office Action issued in U.S. Appl. No. 14/632,359, dated May 4, 2017, 28 pages.
U.S. Patent and Trademark Office, Office Action issued in U.S. Appl. No. 14/789,550 dated May 10, 2017, 38 pages.
U.S. Patent and Trademark Office, Office Action issued in U.S. Appl. No. 14/330,612 dated Dec. 18, 2015, 42 pages.
U.S. Patent and Trademark Office, Office Action issued in U.S. Appl. No. 14/330,612 dated Apr. 21, 2017, 23 pages.
U.S. Patent and Trademark Office, Office Action issued in U.S. Appl. No. 14/330,612 dated Oct. 12, 2017, 18 pages.
U.S. Patent and Trademark Office, Office Action issued in U.S. Appl. No. 14/789,550 dated Oct. 16, 2017, 22 pages.
Chinese Patent Office, First Office Action issued in CN 201611127995.3, 14 pages.

* cited by examiner

METHODS FOR PRODUCING A HIGH PROTEIN CORN MEAL FROM A WHOLE STILLAGE BYPRODUCT AND SYSTEM THEREFORE

TECHNICAL FIELD

The present invention relates generally to corn dry-milling, and more specifically, to methods for producing a high protein corn meal from a whole stillage byproduct produced in a corn dry-milling process for making ethanol and a system therefore.

BACKGROUND

Wet mill corn processing plants convert corn grain into several different co-products, such as germ (for oil extraction), gluten feed (high fiber animal feed), gluten meal (high protein animal feed), and starch-based products, including ethanol, high fructose corn syrup, or food and industrial starch. However, because constructing wet-milling plants is complex and capital-intensive, almost all new plants built today are dry mill plants.

Dry milling plants generally convert corn into only two products, i.e., ethanol and distiller's grains with solubles. A typical corn dry mill process consists of four major steps: grain handling and milling, liquefaction and saccharification, fermentation, and co-product recovery. Grain handling and milling is the step in which the corn is brought into the plant and ground to promote better starch to glucose conversion. Liquefaction and saccharification is where the starch is converted into glucose. Fermentation is the process of yeast converting glucose into ethanol. Co-product recovery is the step in which the ethanol and corn by-products are purified and made market ready.

The recovery of ethanol and co-products generally begins with the beer being sent to a distillation system. With distillation, ethanol is typically separated from the rest of the beer through a set of stepwise vaporizations and condensations. The beer less the alcohol extracted through distillation is known as whole stillage, which contains a slurry of the spent grains including corn protein, fiber, oil, and sugars. But these byproducts are too diluted to be of much value at this point and are further processed to provide the distiller's grains with soluble.

In typical processing, when the whole stillage leaves the distillation column, it is generally subjected to a decanter centrifuge to separate insoluble solids or "wet cake", which includes fiber, from the liquid or "thin stillage", which includes, e.g., proteins and oil. After separation, the thin stillage moves to evaporators to boil away moisture, leaving a thick syrup that contains the soluble (dissolved) solids. The concentrated syrup is typically mixed with the wet cake, and the mixture may be sold to beef and dairy feedlots as distillers wet grain with solubles (DWGS). Alternatively, the wet cake and concentrated syrup mixture may be dried in a drying process and sold as distillers dried grain with solubles (DDGS). The resulting DDGS generally has a crude protein content of about 29% and is an especially useful feed for cattle and other ruminants due to its by-pass protein content.

While DDGS and DWGS provide a critical secondary revenue stream that offsets a portion of the overall ethanol production cost, it would be beneficial to provide a method and system where a higher protein corn product can be obtained from the whole stillage to be sold at a higher cost per ton than DDGS or DWGS.

SUMMARY OF THE INVENTION

The present invention is directed to a method for producing a high protein corn meal from a whole stillage byproduct produced in a corn dry-milling process for making ethanol and a system therefore.

In one embodiment, a method for producing a high protein corn meal from a whole stillage byproduct includes, in a corn dry-milling process for making ethanol, separating the whole stillage byproduct into an insoluble solids portion and a thin stillage portion. The thin stillage portion is separated into a protein portion and a water soluble solids portion. Then, the protein portion is dewatered and dried to define a high protein corn meal that includes at least 40 wt % protein on a dry basis.

In another embodiment, a method for producing a high protein corn meal from a whole stillage byproduct includes, in a corn dry-milling process for making ethanol, subjecting the whole stillage byproduct to a filtration centrifuge, a decanter centrifuge, a pressure screen, or a paddle screen to separate the whole stillage into an insoluble solids portion and a thin stillage portion. The thin stillage is next subjected to a nozzle centrifuge or a cyclone apparatus to separate the thin stillage portion into a protein portion and a water soluble solids portion. Next, the protein portion is subjected to a decanter centrifuge to dewater the protein portion then the dewatered protein portion is dried to define a high protein corn meal that includes at least 40 wt % protein on a dry basis.

In yet another embodiment, a system for producing high protein corn meal from a whole stillage byproduct produced via a corn dry-milling process includes a first apparatus selected from a filtration centrifuge, a decanter centrifuge, a pressure screen, or a paddle screen to separate the whole stillage into an insoluble solids portion and a thin stillage portion. A second apparatus is provided that is selected from a nozzle centrifuge or a cyclone apparatus to separate the thin stillage portion into a protein portion and a water soluble solids portion. The system further includes a decanter centrifuge for dewatering the protein portion, and a drying apparatus that dries the dewatered protein portion so as to yield a high protein corn meal, which includes at least 40 wt % protein on a dry basis.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
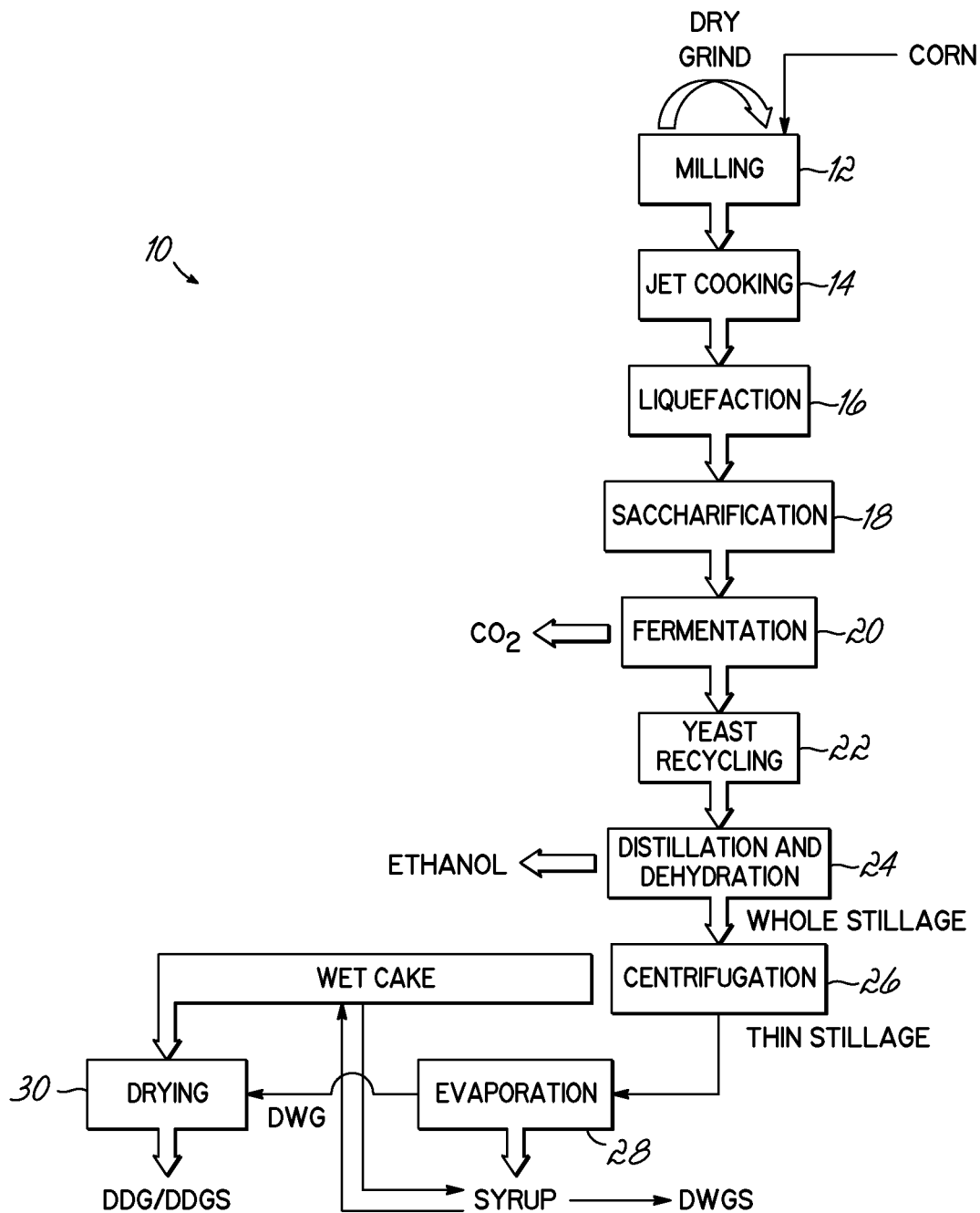
FIG. 1 is a flow diagram of a prior art dry-milling process and system for producing ethanol and distiller's grains with solubles.

FIG. 1 is a flow diagram of a prior art corn dry milling process for producing ethanol, such process is fully discussed in U.S. Pat. No. 7,101,691, entitled "Alcohol Production Using Sonication", which is expressly incorporated by reference herein in its entirety. A significant portion of ethanol in the United States is produced from dry milling processes, which convert corn into two products, namely ethanol and distiller's grains with solubles. And although virtually any type and quality of grain can be used to produce ethanol, the feedstock for this process is typically corn referred to as "No. 2 Yellow Dent Corn."

With specific reference to FIG. 1, a typical corn dry milling process 10 begins with a milling step 12 in which dried whole corn kernels are passed through hammer mills to grind them into meal or a fine powder. The ground meal is mixed with water to create a slurry, and a commercial enzyme such as alpha-amylase is added. This slurry is then heated in a pressurized jet cooking process 14 to solubilize the starch in the ground meal. This is followed by a liquefaction step 16 at which point additional alpha-amylase may be added. The alpha-amylase hydrolyzes the gelatinized starch into maltodextrins and oligosaccharides to produce a liquefied mash or slurry.

This can be followed by separate saccharification and fermentation steps, 18 and 20, respectively, although in most commercial dry mill ethanol processes, saccharification and fermentation occur simultaneously. In the saccharification step 18, the liquefied mash is cooled and a commercial enzyme such as as gluco-amylase is added to hydrolyze the maltodextrins and short-chained oligosaccharides into single glucose sugar molecules. In the fermentation step 20, a common strain of yeast (*Saccharomyces cerevisae*) is added to metabolize the glucose sugars into ethanol and CO2. Upon completion, the fermentation mash ("beer") will contain about 17% to 18% ethanol (volume/volume basis), plus soluble and insoluble solids from all the remaining grain components, including fiber, protein, and oil, for example. Yeast can optionally be recycled in a yeast recycling step 22. In some instances the CO2 is recovered and sold as a commodity product.

Subsequent to the fermentation step 20 is a distillation and dehydration step 24 in which the beer is pumped into distillation columns where it is boiled to vaporize the ethanol. The ethanol vapor is condensed in the distillation columns, and liquid alcohol (in this instance, ethanol) exits the top of the distillation columns at about 95% purity (190 proof). The 190 proof ethanol then goes through a molecular sieve dehydration column, which removes the remaining residual water from the ethanol, to yield a final product of essentially 100% ethanol (199.5 proof).

Finally, a centrifugation step 26 involves centrifuging, via a decanter centrifuge, the residuals or whole stillage leftover from distillation so as to separate the insoluble solids portion or "wet cake", which includes fiber, from the liquid portion or "thin stillage" portion, which includes protein, oil, etc. Next, the thin stillage portion enters evaporators in an evaporation step 28 in order to boil away moisture thereby leaving a thick syrup, which contains the soluble (dissolved) solids as well as protein and oil. This concentrated syrup is typically referred to as corn condensed distillers soluble and is mixed with the centrifuged wet cake then sold to beef and dairy feedlots as distillers wet grain with solubles (DWGS). The wet cake and concentrated syrup mixture may be further dried in a drying step 30 and sold as distillers dried grain with solubles (DDGS) to dairy and beef feedlots. The distiller's grains with solubles co-product provides a critical secondary revenue stream that offsets a portion of the overall ethanol production cost.

Figure 2:
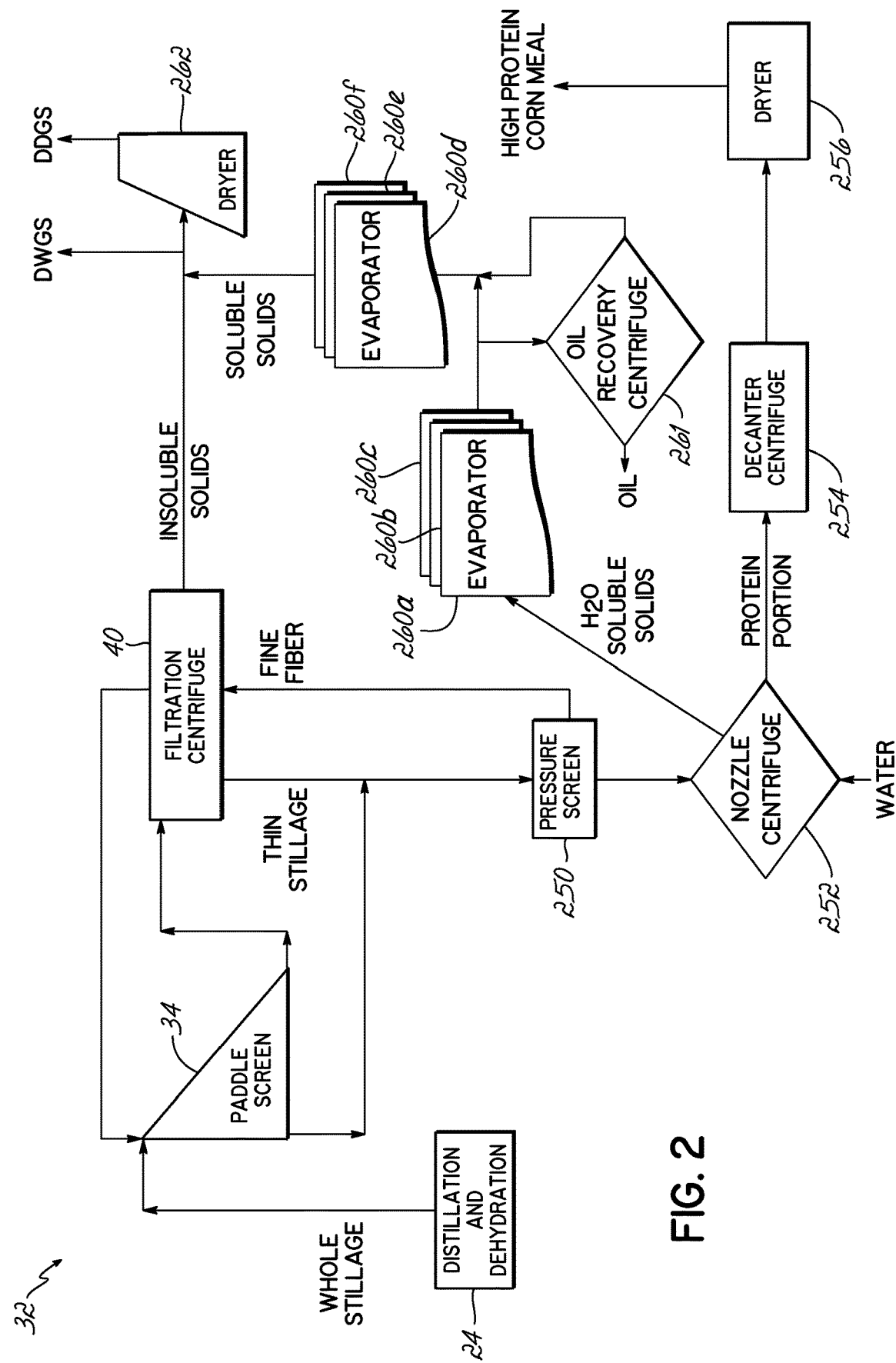
FIG. 2 is a flow diagram of a method and system for producing a high protein corn meal from a whole stillage byproduct produced via a corn dry-milling process for making ethanol in accordance with an embodiment of the invention.

In accordance with the present invention, FIG. 2 schematically illustrates an embodiment of a method and system for producing a high protein corn meal, collectively numeral 32, from the whole stillage byproduct produced in a typical corn dry-milling process 10 like that just described in FIG. 1. Again, the whole stillage byproduct contains a slurry of soluble and insoluble solids, i.e., the spent grains from the distillation and dehydration step 24, which includes protein, fiber, oil, and sugars that are processed in accordance with embodiments of this invention to produce a high protein corn meal that can be sold, e.g., as pig and chicken feed, at a higher cost per ton than typical DDGS or DWGS. In one embodiment, the resulting high protein corn meal includes at least 40 wt % protein on a dry basis as compared to a protein content of about 29% typically found in DDGS.

With further reference to FIG. 2, the whole stillage byproduct can be piped from the typical corn dry mill distillation and dehydration step 24 and subjected to an optional paddle screen 34. The optional paddle screen 34 is situated before a filtration centrifuge 40, which is further discussed below, so as to aid ultimately in separation of the insoluble solids portion, e.g., fiber, from the thin stillage portion by initially filtering out desirable amounts of water and protein and, incidentally, small fiber fines from the whole stillage byproduct. This initial screening can help reduce the resulting load on the subsequent filtration centrifuge 40. The resulting underflow from the paddle screen 34 eventually joins with the thin stillage underflow from the filtration centrifuge 40, as will be discussed in greater detail below.

To filter the whole stillage byproduct, the optional paddle screen 34 can include screen openings of no greater than about 150 microns. In another example, the paddle screen 34 can include openings therein of no greater than about 100 microns. In yet another example, the openings therein are no greater than about 50 microns. It should be understood that these values are exemplary and that those of ordinary skill in the art will recognize how to determine the size of the openings to achieve the desired filtration. In one example, the optional paddle screen 34 is a standard type paddle screen as is known in the art. One such suitable paddle screen 34 is the FQ-PS32 available from Fluid-Quip, Inc. of Springfield, Ohio. It should be understood that the optional paddle screen 34 may be replaced with other types of pre-concentration devices, e.g., a standard pressure screen or conic centrifuge, which can perform the desired filtration or preconcentration function. One such suitable pressure screen is the PS-Triple available from Fluid-Quip, Inc. of Springfield, Ohio.

Figure 3:
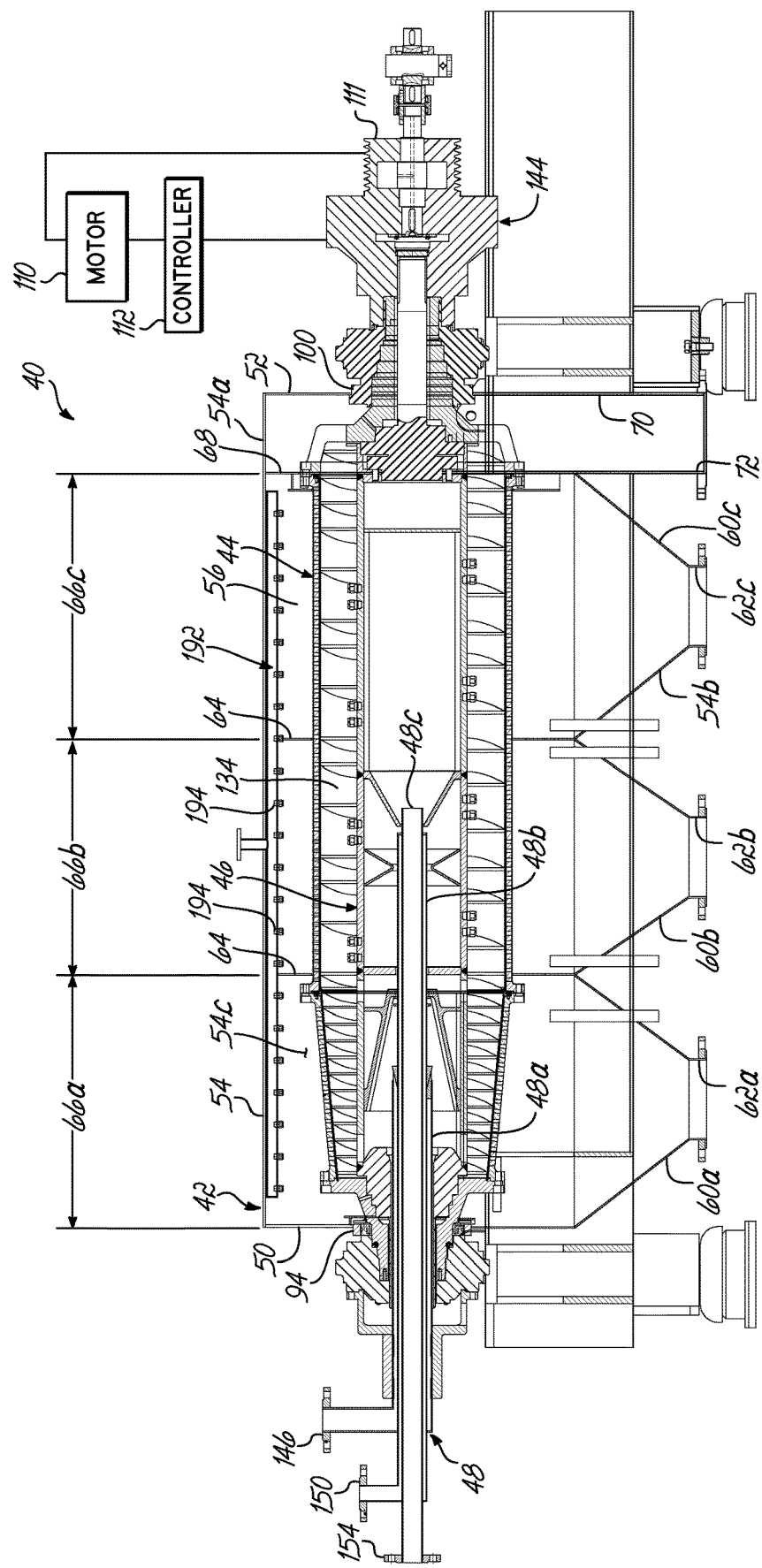
FIG. 3 is a cross-sectional view of a filtration centrifuge in accordance with one embodiment of the invention.

With reference now to FIGS. 3-10, these figures illustrate embodiments of the filtration centrifuge 40 whereat the whole stillage byproduct is separated into the insoluble solids portion, which includes fiber, and the thin stillage portion, which includes protein, oil, etc. One such suitable filtration centrifuge is described in U.S. patent application Ser. No. 12/435,451 entitled "Apparatus and Method for Filtering a Material from a Liquid Medium", and filed May 5, 2009, the contents of which is expressly incorporated by reference herein in its entirety. As best shown in FIG. 3, the filtration centrifuge 40 is a single, self-contained device that may be configured to perform both the initial filtering (sometimes referred to as a pre-concentration) of the whole stillage byproduct and washing of the fiber so as to clean the fiber and remove protein and other components that remain associated with the fiber after the initial filtration or preconcentration.

The washing of the fiber may include a washing cycle, wherein the fiber is mixed and rinsed in wash water, followed by a de-watering cycle, wherein the wash water is separated from the fiber. The washing of the fiber may include multiple rinsing/de-watering cycles. Additionally, a counter current washing technique may be employed to save wash water usage. After washing the fiber, but before the fiber exits the centrifuge, the fiber may go through an enhanced de-watering stage, a compaction stage, and/or an air dry stage to further de-water or dry the fiber. This may save the dryer capacity or eliminate the dryer altogether. In reference to FIG. 3, and in one exemplary embodiment, the filtration centrifuge 40 includes an outer housing 42, a generally tubular inner housing or basket 44 (filtration screen) substantially disposed in the interior of outer housing 42, a conveyor 46 generally coaxially disposed in the basket 44, and a plurality of conduit lines 48 generally coaxially disposed in conveyor 46 and adapted to receive the slurry, i.e., whole stillage byproduct, and wash water therethrough.

The outer housing 42 includes a first end wall 50, a second end wall 52 opposite and spaced from the first end wall 50, and at least one side wall 54 connecting the first and second end walls 50, 52 so as to define an interior 56. The outer housing 42 may have any suitable shape. For example, in one embodiment, the outer housing 42 may be generally rectangular including an upper side wall portion 54a, a lower side wall portion 54b, and a pair of lateral side wall portions 54c (one shown in FIG. 3) extending therebetween. The use of descriptive terms upper, lower, and lateral for the side walls 54 are used to facilitate the description of the filtration centrifuge 40 and should not be construed to limit the centrifuge 40 to any particular orientation. As shown in FIG. 3, the lower side wall portion 54b may include a plurality of panels that collectively define one or more (three shown in FIG. 3) funnel-shaped hoppers 60a, 60b, 60c, each hopper having a corresponding outlet 62a, 62b, 62c. As discussed in more detail below, a multi-hopper configuration provides for collection of the slurry (minus the fiber) in the pre-concentration stage and the wash water in the washing stages (and from the wash water in the enhanced de-watering stage and compaction stage if such stages are utilized). The multi-hopper configuration also provides for a counter current wash water technique to be utilized.

The outer housing 42 further includes one or more interior panels 64 that generally compartmentalize the filtration centrifuge 40 into a plurality of zones 66. For example, and as explained in more detail below, the panels 64 may generally define a pre-concentration zone 66a and one or more washing zones 66b, 66c (two shown in FIG. 3). Although two washing zones are illustrated in FIG. 3, those of ordinary skill in the art will appreciate that the number of washing zones may be application specific. For example, in the corn dry mill process described above, it is contemplated that between one and six washing zones, and preferably between two and four washing zones, may be included in the filtration centrifuge 40. More zones, however, are considered to be within the scope of the invention. In addition to the above panels 64 and corresponding zones 66, an interior panel 68 adjacent the second end 52 of the outer housing 42 also defines an exit chute 70 including an outlet 72 for receiving the filtered and washed material (e.g., fiber) processed by filtration centrifuge 40.

As mentioned above, and as illustrated in FIGS. 3 and 4, the basket 44 is disposed in the interior 56 of outer housing 42 and includes a first end 74 defined by a first hub 76, a second end 78 defined by a second hub 80, and at least one side wall 82 extending between the first and second ends 74, 78 and coupled to the first and second hubs 76, 80. While the basket 44 may have any suitable shape, in one embodiment, the basket 44 may be generally cylindrical and have a generally circular cross-sectional shape characterized by a basket diameter Db. In one embodiment, the basket diameter Db may be substantially constant along the length of the basket 44 (e.g., right circular cylinder) (not shown).

Figure 4:
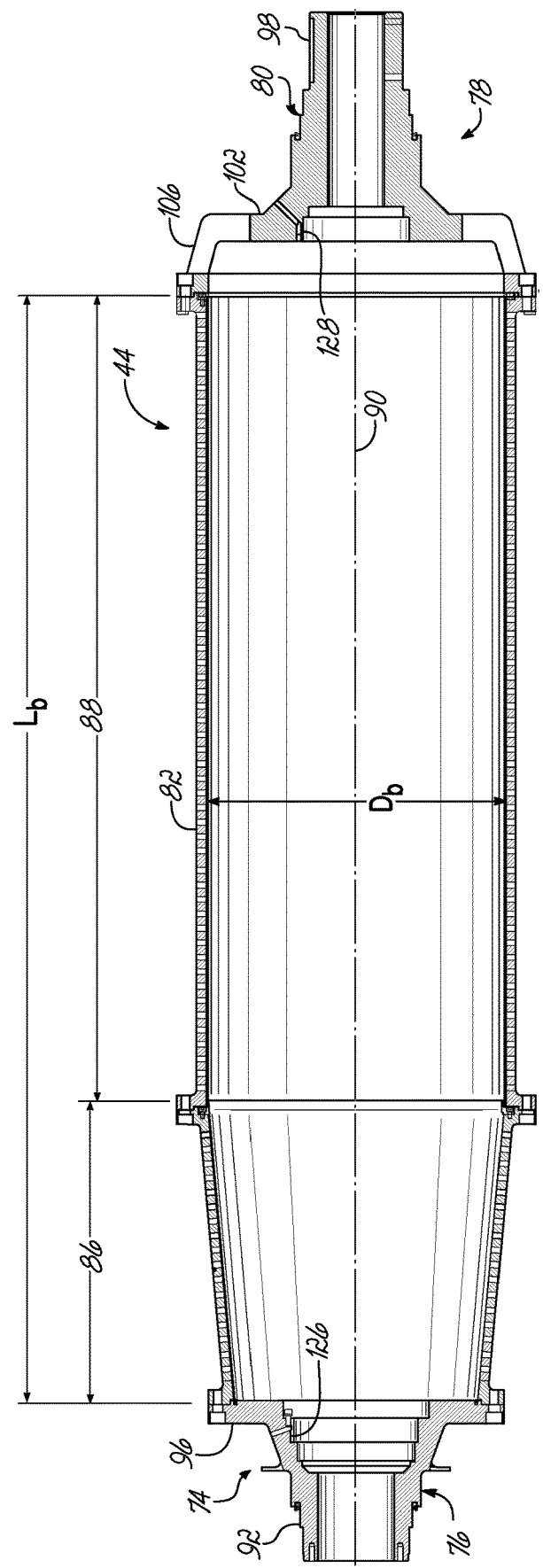
FIG. 4 is a cross-sectional view of the inner housing or basket shown in the filtration centrifuge of FIG. 3.

In another embodiment, however, the basket diameter Db may vary along at least one or more portions of the length Lb of the basket 44. By way of example, and as shown in FIG. 4, the basket 44 may include a first basket section 86 adjacent the first end 74 of the basket 44. The first basket section 86 includes a generally outwardly tapered (i.e., diverging) or cone-shaped configuration in a direction from first end 74 toward second end 78. The first basket section 86 may be followed by a second basket section 88 generally configured as a right circular cylinder. The first basket section 86 (e.g., the conical-shaped section) may extend between 0%-100% of the length of the basket 44. In one embodiment, however, the first basket section 86 extends for about 10% to about 30% of the length Lb of the basket 44, and may substantially correspond in length to the pre-concentration zone 66a of the filtration centrifuge 40. The cone angle in the first basket section 86 may be selected based on the specific application and/or other factors including, for example, desired cake thickness or other desired aspects of the fiber or constituents removed with the water through the side wall 82.

The side wall 82 of the basket 44 may be configured as a screen so as to separate or filter the desired material from the liquid medium. For example, to separate or filter fiber from the initial slurry or the wash water (depending on the particular zone), the side wall 82 of the basket 44 may be configured as a screen adapted to permit the slurry (minus the fiber) and the wash water (and any protein and/or oil washed off the fiber) to pass through the screen while preventing the fiber from passing therethrough. To this end, the screened side wall 82 may have several configurations. For example, in one embodiment, the side wall 82 may be generally solid with a plurality of holes or fenestrations formed therein and sized so as to achieve the filtration of the desired material. In another embodiment, the screened side wall 82 may be formed from wrapped wedge wire that defines the plurality of openings. In still further embodiments, the screened side wall 82 may be a bar screen, a thin metal screen (e.g., mesh screen), or a filter cloth having a metal reinforced design. Those of ordinary skill in the art will recognize other types of screens that may be used in accordance with embodiments of the invention. The openings in the screened side wall 82 may vary depending on the specific application and on the type of material being filtered. For example, for fiber filtration, it is contemplated that the openings in side wall 82 may be sized between approximately 35 microns and approximately 1,500 microns. And in another example, it is contemplated that the openings in side wall 82 may be sized between approximately 50 microns and approximately 150 microns. These values are exemplary and those of ordinary skill in the art will recognize how to determine the size of the openings to achieve the filtration of the desired material.

In one aspect in accordance with various embodiments, the basket 44 is adapted to rotate about a central axis 90 so as to drive the liquid medium toward the side wall 82 of basket 44. For example, rotation of the basket 44 generates a centrifugal force that drives the slurry or fiber/wash water mixture (depending on the stage along the filtration centrifuge 40) toward the screened outer side wall 82. This force essentially presses the slurry or fiber/wash water mixture against the screen so as to trap the fiber while allowing the liquid medium (and any smaller constituents such as protein and oil) to pass through the screen. The first and second hubs 76, 80, which are coupled to the screened side wall 82, are configured to facilitate rotation of the basket 44 within the outer housing 42. In this regard, the first hub 76 includes an extension portion 92 that extends through an opening 94 (FIG. 3) in the first end wall 50 of the outer housing 42, and a flange portion 96 coupled to side wall 82. As is generally known in the art, first hub 76 may include various seals, bearings, and/or other fittings that allow the first hub 76 to rotate relative to the opening 94 in end wall 50 of outer housing 42. As discussed in more detail below, the first hub 76 also rotates relative to the conveyor 46 and conduit lines 48 that extend within or into the basket 44 (FIG. 3). Those of ordinary skill in the art will recognize conventional components (e.g., seals, bearings, fittings, etc) that permit such relative movement therebetween as well.

In a similar manner, second hub 80 includes an extension portion 98 that extends through an opening 100 (FIG. 3) in the second end wall 52 of outer housing 42, and a flange portion 102 coupled to side wall 82. As is generally known in the art, second hub 80 may include various seals, bearings, and/or other fittings that allow the second hub 80 to rotate relative to the opening 100 in end wall 52 of outer housing 42. As discussed in more detail below, the second hub 80 also rotates relative to the conveyor 46 that extends within the basket 44 (FIG. 3). Those of ordinary skill in the art will recognize conventional components (seals, bearings, fittings, etc) that permit such relative movement therebetween. As shown in FIG. 4, the flange portion 102 of second hub 80 includes a coupling between the side wall 82 and the second hub 80 having a plurality of circumferentially-spaced legs 106 that define openings (not shown) therebetween. The openings allow the filtered material exiting the last washing stage, such as washing zone 66c in FIG. 3 (or enhanced de-watering stage, compaction stage, air dry stage, or other stage adjacent chute 70), to flow to chute 70 and through outlet 72, where the material may be collected for further processing.

In reference to FIG. 3, rotation of the basket 44 may be achieved by a suitable motor or other motive force-generating device. By way of example, the second hub 80 may be operatively coupled to a motor, shown schematically at 110, so as to cause second hub 80 and thus basket 44 to rotate about central axis 90. For example, a suitable belt (not shown) may couple the motor 110 to a pulley 111 on filtration centrifuge 40 to rotate basket 44. In one embodiment, the motor 110 may be coupled to a controller, such as a computer, and shown schematically at 112, for controlling the rotational speed of the basket 44. Such a controller 112 is generally known to those of ordinary skill in the art. Thus, the rotational speed of the basket 44 may be selectively varied depending on the specific application. In one embodiment, the basket 44 may be rotated at a speed (e.g., revolutions per minute) that generates a G force between approximately 100 G to 4,000 G (and may depend on basket diameter, type of material being filtered, etc.) at the side wall 82 of the basket 44. In one embodiment, such as for corn dry milling processes, the basket 44 may be rotated at a speed so as to generate between approximately 300 G and approximately 1,200 G at the side wall 82. Those of ordinary skill in the art will recognize that these values are exemplary and the speeds may be selected and optimized to meet the needs of a particular application.

In another aspect of various embodiments, the filtration centrifuge 40, which may include a pre-concentration zone, one or more washing zones, and possible other zones (e.g., de-watering, compaction, air, etc.), may have a L/D ratio greater than two. In one embodiment, the filtration centrifuge 40 may have a L/D ratio between approximately 2 and 10, and more preferably between 4 and 6. These values are exemplary and those of ordinary skill in the art will recognize other ratios suitable for a particular application.

The relatively large L/D ratio may be achieved by using a relatively small basket diameter Db (e.g., maximum value such as along second basket section 88) and a relatively large basket length Lb. By way of example, the basket diameter Db at its maximum value may be between approximately 100 mm and approximately 1,500 mm, and more particularly between approximately 200 mm and approximately 1,000 mm. The relatively small basket diameter Db of filtration centrifuge 40 provides higher G forces imposed on the liquid medium (e.g., slurry or fiber/wash water mixture) at the screened side wall 82, and thus allows for a greater amount of liquid to be removed from the filtered material resulting in a dryer product. For example, it is anticipated that the fiber material that exits the filtration centrifuge 40 via exit chute 70 may be between approximately 55% and approximately 75% water. The relatively large basket length Lb of filtration centrifuge 40 provides a low cost per filtration area.

Figure 5:
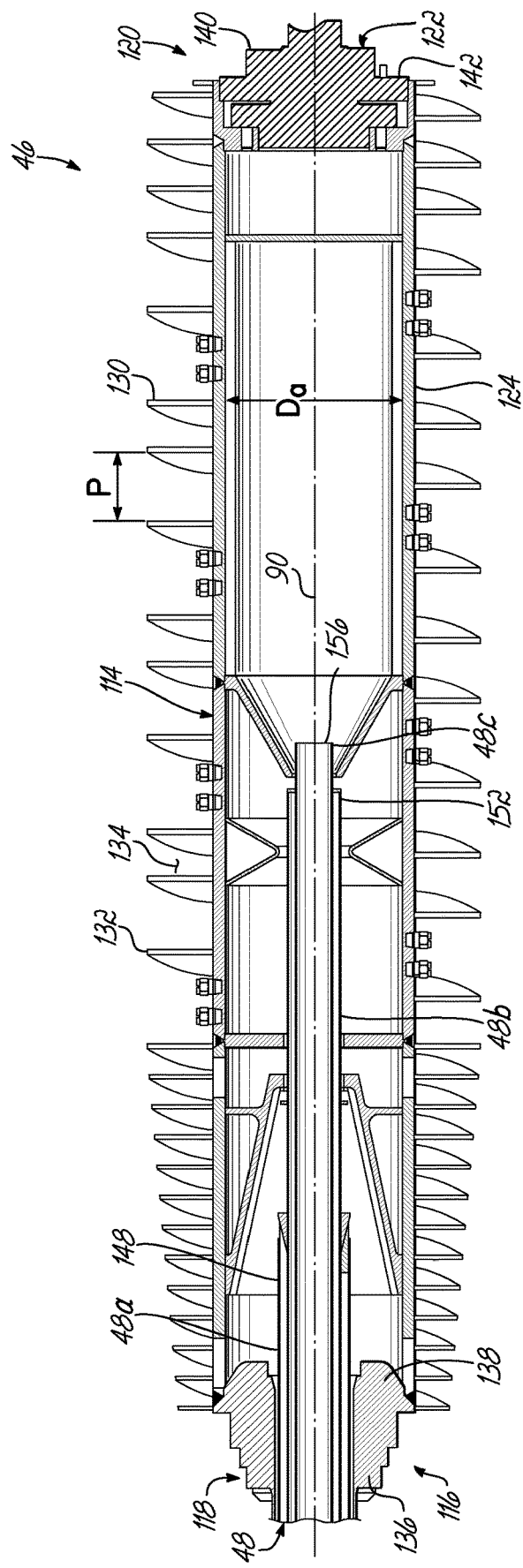
FIG. 5 is cross-sectional view of the conveyor shown in the filtration centrifuge of FIG. 3.

In another aspect of various embodiments, filtration centrifuge 40 further includes a conveyor 46 for moving or scrolling the material in the liquid medium from the first end 74 of the basket 44 toward the second end 78 thereof and to keep the filtration area at the screened side wall 82 clean. As illustrated in FIGS. 3 and 5, in one embodiment, the conveyor 46 may be configured as a generally hollow screw or auger 114 generally coaxially disposed within the basket 44. The auger 114 includes a first end 116 defined by a first hub 118, a second end 120 defined by a second hub 122, and at least one side wall 124 extending between the first and second ends 116, 120 and coupled to the first and second hubs 118, 122. The first and second hubs 118, 122 of the auger 114 may be operatively coupled to the first and second hubs 76, 80 of the basket 44. By way of example, the first and second hubs 76, 80 of the basket 44 may include cavities 126, 128 (FIG. 4), respectively, for receiving the first and second hubs 118, 122 of the auger 114 therein. While the auger 114 may have any suitable shape, in one embodiment, the auger 114 may be generally cylindrical and have a generally circular cross-sectional shape characterized by an auger diameter Da. In one embodiment, the auger diameter Da may be substantially constant along the length of the auger 114. In an alternative embodiment, however, the auger diameter Da may vary along the length of the auger 114, such as by having a generally conical shape (not shown). As recognized by those of ordinary skill in the art, other configurations may also be possible.

To facilitate movement of the desired filtered material (e.g., fiber) along the filtration centrifuge 40, the auger 114 may include at least one generally radially-extending, helical thread 130 projecting from the side wall 124 of the auger 114. The thread 130 includes an outer edge 132 configured to be located in close proximity to the inner surface of the side wall 82 of the basket 44 (FIG. 3). For example, a small gap (on the order of 0.3 mm-2.0 mm) may exist between the outer edge 132 of the thread 130 and the side wall 82 of the basket 44 so as to accommodate, for example, relative movement therebetween, yet remain effective for keeping the filtration area at the screened side wall 82 clean. As explained in more detail below, the generally annular space 134 defined between the auger 114 and the basket 44 (FIG. 3), and occupied by the threads 130, provides a fluid flow passage for the liquid medium (e.g., slurry or wash water) during the filtration of the material (e.g., fiber). Accordingly, the annular space 134 must be sized to accommodate the design throughput of the filtration centrifuge 40. In an exemplary embodiment, for example, the auger 114 may have an auger diameter Da between approximately 0.4 Db and 0.8 Db and the distance between the auger 114 and the basket 44 (nearly equal to the height of thread 130) is between approximately 0.01 Db and 0.4 Db. These values are exemplary and those of ordinary skill in the art may readily determine the auger diameter Da and/or radial spacing between the auger 114 and the basket 44 for specific applications.

Figure 6:
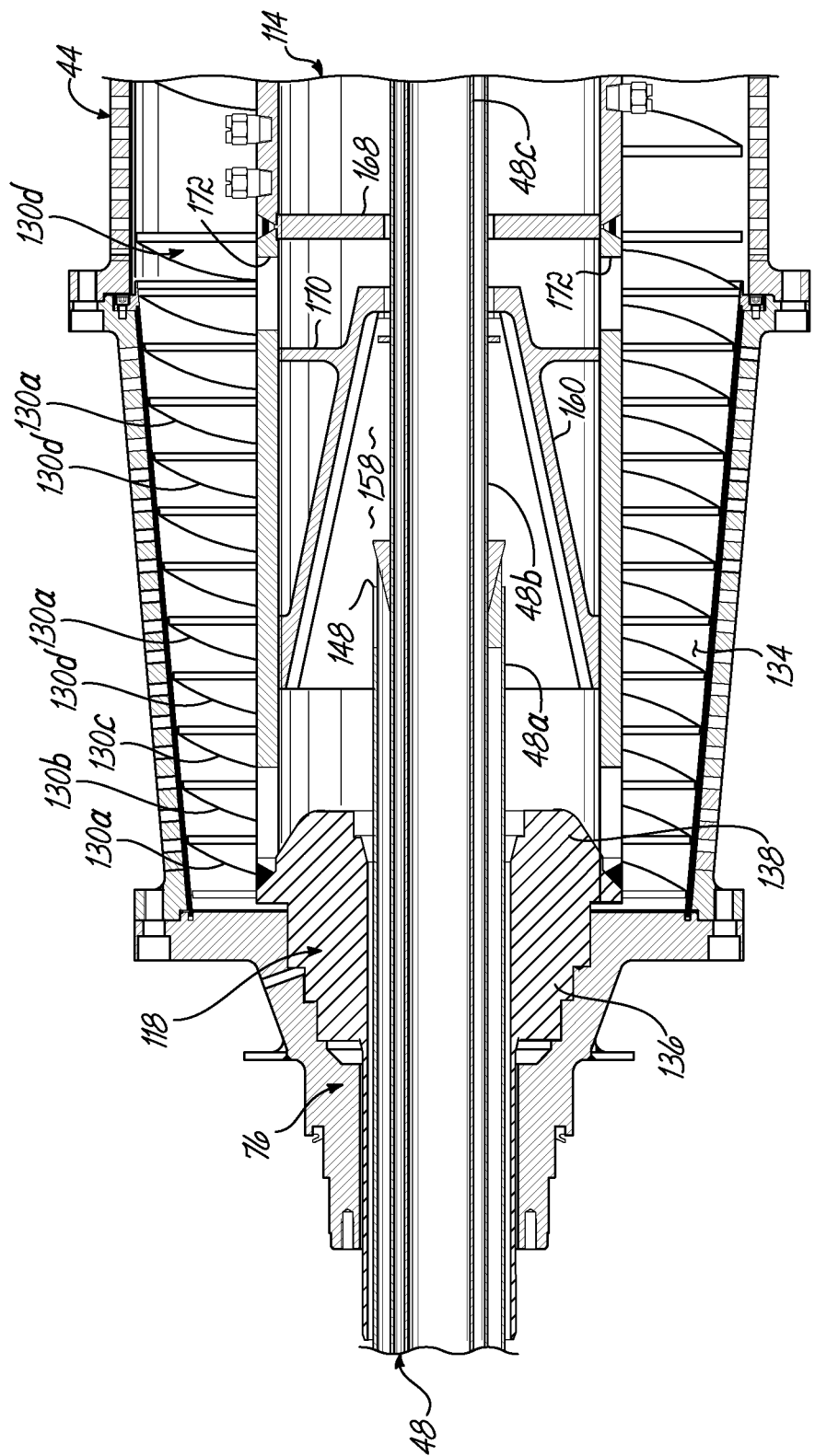
FIG. 6 is an enlarged view of a portion of the filtration centrifuge shown in FIG. 3.

In one embodiment, and as illustrated in FIGS. 5 and 6, the auger 114 may have a multi-flight configuration (e.g., having multiple helical threads extending along at least a portion of the length thereof). By way of example, the auger 114 may include between 2 and 6 flights, and more preferably between 3 and 4 flights (4 shown) along at least a portion of the auger length. While each of the flights 130a, 130b, 130c, 130d may extend the full length of the auger 114, in one embodiment, one or more of the flights may extend for less than the full length of the auger 114. More particularly, in one exemplary embodiment, the multi-flight configuration of the threads 130a, 130b, 130c, 130d may extend along the length of the auger 114 corresponding to the length of the pre-concentration zone 66a and only one of the threads, e.g., 130a, may extend thereafter along the washing zones 66b, 66c. In this regard, it is believed that the multi-flight configuration of the threads 130 in the pre-concentration zone 66a at least in part effectively enhances the filtering of the material from the liquid medium while preventing the basket 44 from plugging. Those of ordinary skill in the art will recognize other configurations of threads 130 that facilitate the movement of the material through the filtration centrifuge 40 to meet the requirements of a particular application, and the invention is not limited to the particular configuration shown in FIG. 6. For example, auger 114 may have a single flight configuration, such as that shown in FIG. 10.

In addition to the multi-flight configuration of the threads 130 on auger 114, another design variable that allows the auger 114 to be configured for specific applications is the pitch P of the threads 130 along the length of the auger 114 (FIG. 5). In one embodiment, for example, the pitch P may vary along the length of the auger 114. More specifically, in one exemplary embodiment, the pitch P of the threads 130 in the pre-concentration zone 66a may be relatively large, such as between 0.1 Db and 0.6 Db, and decrease in the washing zones 66b, 66c. For example, the pitch in the washing zones 66b, 66c may be between 0.1 Db and 0.4 Db. In this regard, it is believed that the relatively large pitch configuration of the threads 130 in the pre-concentration zone 66a at least in part effectively enhances the filtering of the material from the liquid medium while preventing the basket 44 from plugging. Those of ordinary skill in the art will recognize other variable pitch configurations of threads 130 that facilitate the movement of the material through the filtration centrifuge 40 to meet the requirements of a particular application, and the invention is not limited to the particular pitch configuration shown in FIGS. 5 and 6. For example, the pitch P may be relatively constant along the length of the auger 114.

In a further aspect in accordance with various embodiments, the auger 114 is adapted to rotate about central axis 90. Rotation of the auger 114 causes the thread(s) 130 to rotate in order to move the filtered material (e.g., fiber) down the filtration centrifuge 40. The first and second hubs 118, 122, which are coupled to the side wall 124 of auger 114, are configured to facilitate rotation of the auger 114 within the basket 44. In this regard, the first hub 118 includes an extension portion 136 that extends into the cavity 126 of the first hub 76 of the basket 44, and a flange portion 138 coupled to the side wall 124. As is generally known in the art, first hub 118 may include various seals, bearings, and/or other fittings that allow the first hub 118 to rotate relative to the first hub 76 of the basket 44. The first hub 118 of auger 114 also rotates relative to the conduit lines 48 that extend within the interior of the auger 114. Those of ordinary skill in the art will recognize conventional components (e.g., seals, bearings, fittings, etc.) that permit such relative movement therebetween as well.

In a similar manner, second hub 122 includes an extension portion 140 that extends into the cavity 128 of the second hub 80 of the basket 44, and a flange portion 142 coupled to the side wall 124. As is generally known in the art, second hub 122 may include various seals, bearings, and/or other fittings that allow the second hub 122 to rotate relative to the second hub 80 of the basket 44. As there may be no conduit line extending through second hub 122, the hub may have a closed configuration (FIG. 5).

Rotation of the auger 114 may be achieved by a suitable motor or other motive force-generating device. For example, one of the first or second hubs 118, 122 may be operatively coupled to an electric motor so as to cause the auger 114 to rotate about central axis 90 (not shown). Although the motor that rotates the auger 114 may be separate from the motor 110 that rotates the basket 44, in one exemplary embodiment, and as schematically illustrated in FIG. 3, motor 110 may also be used to rotate the auger 114. Those of ordinary skill in the art will recognize that if separate motors are used to rotate the basket 44 and auger 114, the motors may be controlled by the same controller, such as controller 112, or by separate controllers (not shown).

In the embodiment illustrated in FIG. 3, the same motor 110 and controller 112 provide for and control the speed of both the basket 44 and the auger 114. Although the filtration centrifuge 40 may be configured such that the basket 44 and auger 114 rotate at the same speed, in an exemplary embodiment, the basket 44 and auger 114 may be configured to rotate at different speeds. In this regard, the filtration centrifuge 40 may include a gear box, schematically shown at 144, to provide for the different rotational speeds between the basket 44 and the auger 114. Such gear boxes 144 and their internal components are generally known in the art and a detailed description herein will be omitted. In one embodiment, for example, the gear box 144 may be configured to reduce the rotational speed of the auger 114 relative to the basket 44. Alternatively, the gear box 144 may be configured to increase the rotational speed of the auger 114 relative to the basket 44.

The gear box 144 may be operatively coupled to the controller 112 for controlling the differential in the rotational speeds (schematically shown in FIG. 3). For example, the gear box 144 may be coupled to a small motor (not shown), which is operatively coupled to the controller 112, that controls the differential rotational speed between the basket 44 and the auger 114. In one embodiment, the gear box 144 may be configured such that a differential in rotational speed between the basket 44 and auger 114 is between 0 and about 200 rpm. This range is exemplary and, depending on the configuration of the gear box 144, those of ordinary skill in the art will recognize that the range may be adjusted to meet a specific application. Those of ordinary skill in the art may also recognize other known devices for creating a differential speed between the basket 44 and auger 114, including, for example, various gear reduction designs and hydraulic drives.

The filtration centrifuge 40 includes a plurality of generally concentric conduit lines 48 generally coaxially disposed in auger 114 for supplying liquid medium (e.g., the slurry and wash water) to the centrifuge 40. The number of conduit lines 48 generally corresponds to the number of zones 66 in the filtration centrifuge 40. By way of example, and as shown in FIGS. 3 and 5, the filtration centrifuge 40 includes one pre-concentration zone 66a and two washing zones 66b, 66c. Accordingly, fluid conduit lines 48 include one slurry supply line 48a and two wash water supply lines 48b, 48c. The slurry supply line 48a includes an inlet 146 for receiving the whole stillage byproduct and an outlet 148 positioned in the pre-concentration zone 66a of the filtration centrifuge 40 and within the interior of auger 114. In a similar manner, the first water supply line 48b includes an inlet 150 (FIGS. 1 and 6) for receiving wash water and an outlet 152 positioned in the first washing zone 66b and within the interior of the auger 114. The second water supply line 48c includes an inlet 154 (FIGS. 1 and 6) for receiving wash water and an outlet 156 positioned in the second washing zone 66c and within the interior of the auger 114.

Figure 7:
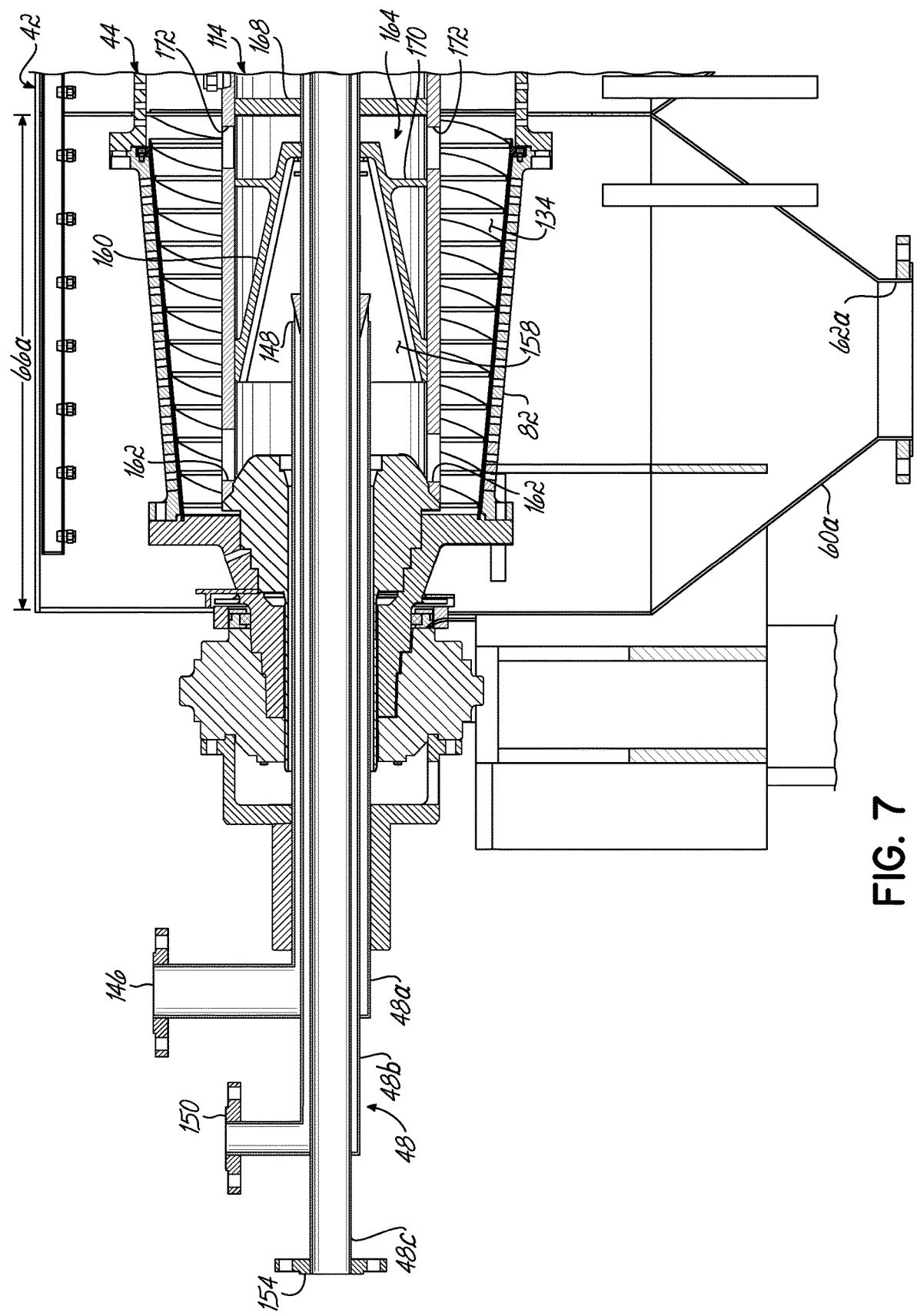
FIG. 7 is an enlarged view of a portion of the filtration centrifuge shown in FIG. 3 illustrating the pre-concentration zone.

Operation of the filtration centrifuge 40 will now be described. To facilitate understanding of various aspects of the invention, operation of the filtration centrifuge 40 will be described in the context of fiber filtration in a corn dry mill process. It should be appreciated, however, that the filtration centrifuge 40 may be used in a wider range of applications and is not limited in use to the corn dry mill process described herein. The motor 110 is activated so as to initiate rotation of the basket 44 and the auger 114 at their designated speeds, as described above. As best illustrated in FIG. 7, the whole stillage byproduct, or slurry, is supplied to the inlet 146 of the slurry conduit 48a so as to flow through the outlet 148 and into a chamber 158 within the auger 114 and generally associated with the pre-concentration zone 66a. The chamber 158 includes a generally cone-shaped guide 160 that directs the slurry into the annular space 134 between the auger 114 and the basket 44. In this regard, the auger 114 may include at least one opening 162 (two shown) that provides fluid communication between the chamber 158 and the annular space 134. Due to the rotation of the auger 114 and the resulting motion of the threads 130, the slurry is moved along the length of the pre-concentration zone 66a and is filtered from the slurry by allowing the water, protein, oil, and other relatively small constituents of the slurry to pass through the screened side wall 82 of the basket 44 and drain into hopper 60a while the fiber and possibly relatively large constituents of the slurry are retained in the basket 44.

Due to the relative rotation between the conduit lines 48 and the auger 114, it may be possible for fiber to pass by the cone guide 160 within the auger 114 and pass into the washing zones 66b, 66c. To prevent or reduce the likelihood of such an event, the filtration centrifuge 40 may include a leak chamber 164 positioned about an end of the guide 160. The chamber 164 is defined by a baffle plate 168 at one end thereof and by a closed web 170 at an opposite end thereof and extending between the guide 160 and the auger 114. The auger 114 may include at least one opening 172 (two shown) that provides fluid communication between the leak chamber 164 and the annular space 134. Thus, should any fiber leak past the end of the guide 160 and into leak chamber 164, the fiber will flow through the openings 172 and into the annular space 134. In this way, the likelihood of fiber passing beyond the baffle plate 168 is significantly reduced. As explained in more detail below, fiber is undesirable in the washing zones 66b, 66c due to possible plugging of nozzles used in those zones.

At the end of the pre-concentration zone 66a, the fiber has been sufficiently concentrated so as to allow the fiber to be washed. For example, in one embodiment, the fiber is believed to be between about 55% and about 75% water at the end of the pre-concentration zone 66a. At such concentration levels, the fiber may be effectively washed to remove the additional protein, for example, that remains associated with the fiber after the initial pre-concentration zone 66a (e.g., utilizing displacement washing techniques). To this end, the threads 130 of the auger 114 move the fiber along the length of the filtration centrifuge 40 and into the first washing zone 66b (FIG. 1). In reference to FIGS. 3, 7 and 8, wash water is supplied to the inlet 150 of the first water conduit 48b so as to flow through the outlet 152 and into a chamber 174 generally associated with the first washing zone 66b. The chamber 174 is bounded on one side by the baffle plate 168 and bounded on the opposite side by a conical member 176, which includes an end adjacent the conduit lines 48. The chamber 174 may further include a support member 180 that supports the water conduit lines 48b, 48c within chamber 174.

Figure 8:
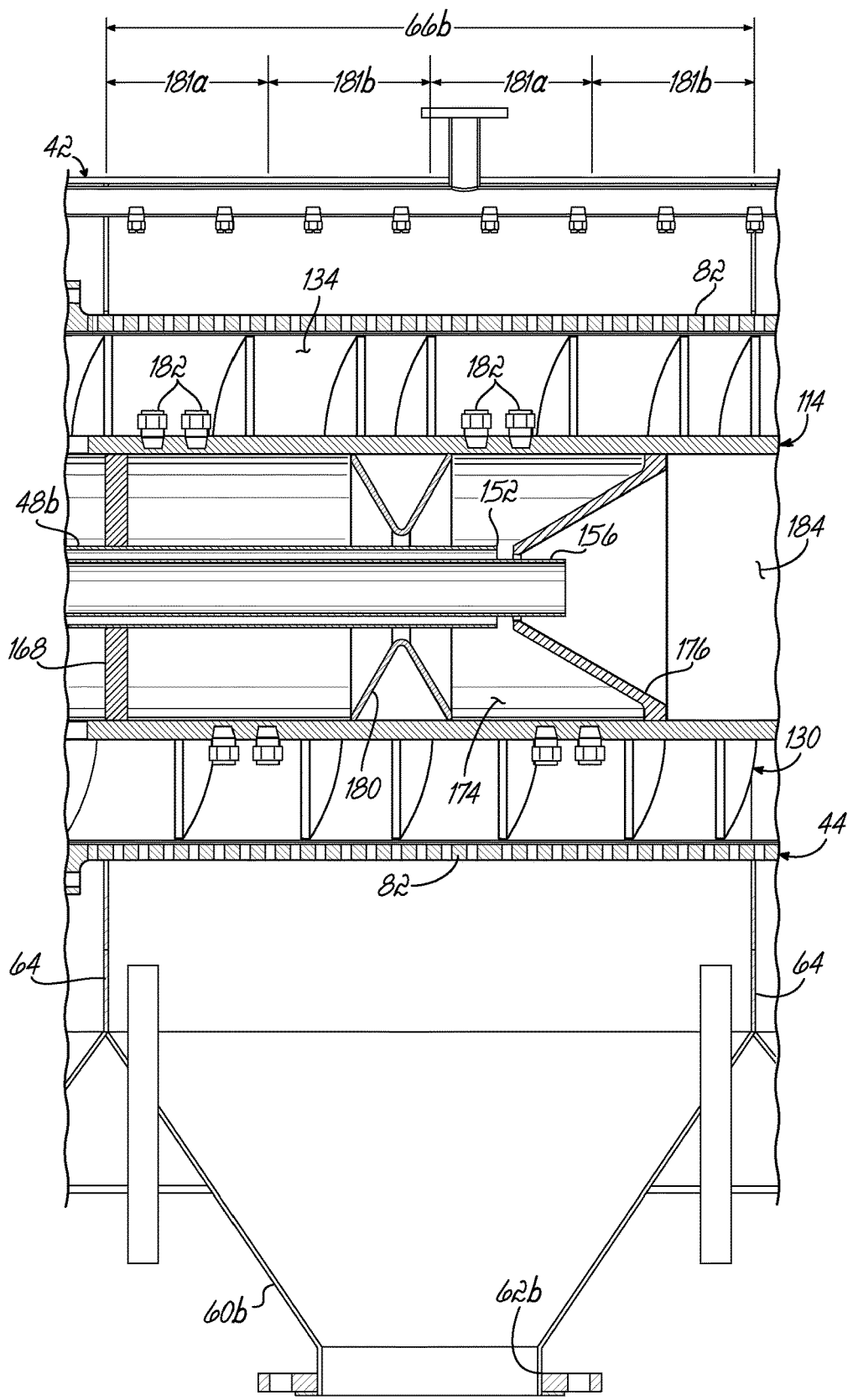
FIG. 8 is an enlarged view of a portion of the filtration centrifuge shown in FIG. 3 illustrating the first washing zone.
Figure 9:
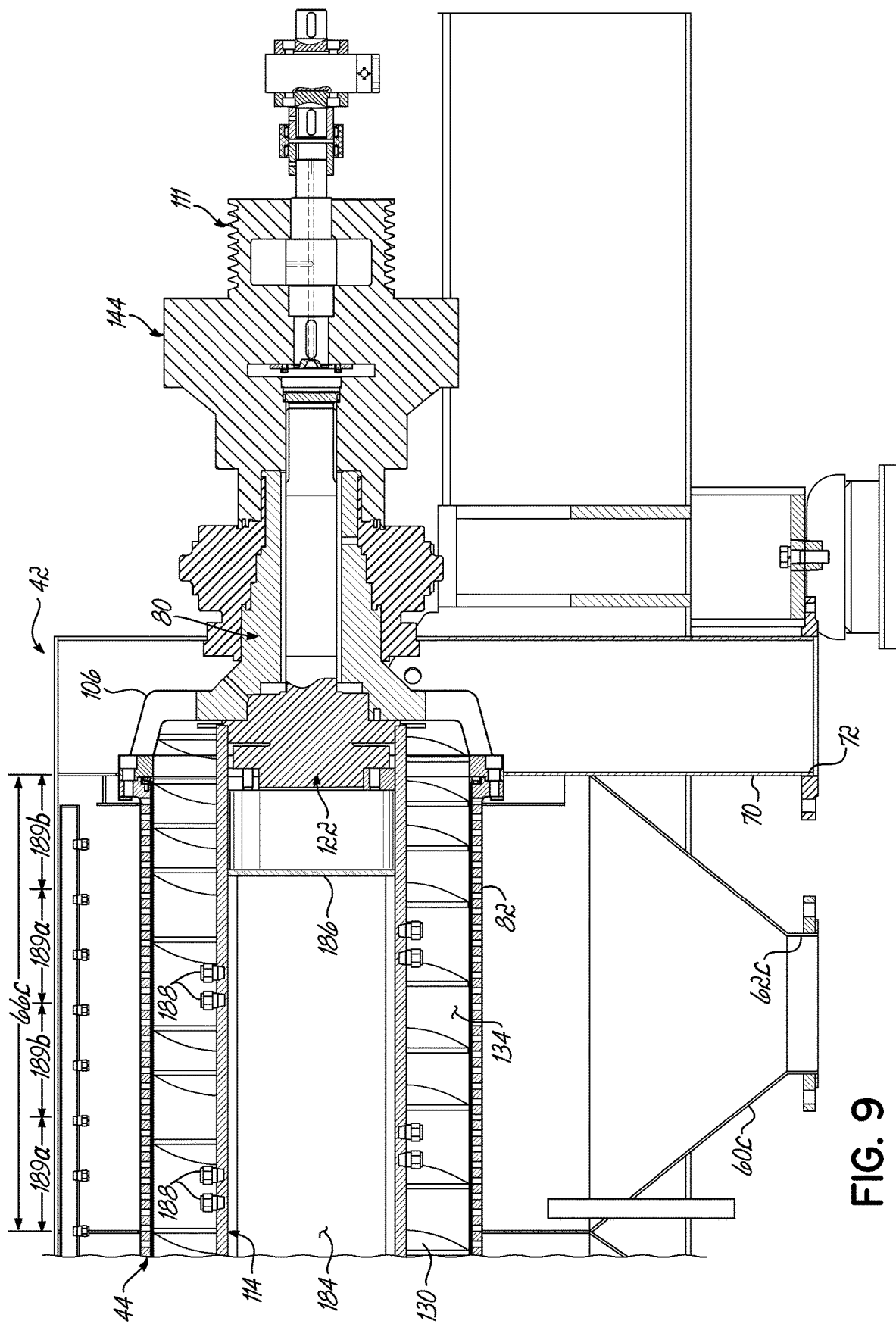
FIG. 9 is an enlarged view of a portion of the filtration centrifuge shown in FIG. 3 illustrating the second washing zone.

The first washing zone 66b includes at least one rinsing stage 181a and at least one de-watering stage 181b. For example, as illustrated in FIG. 8, the first washing zone 66b includes two rinsing/de-watering cycles. This is exemplary and those of ordinary skill in the art will recognize that the number of rinsing/de-watering cycles may vary depending on the specific application. In the rinsing stage 181a, wash water is added to the fiber to remove the additional protein, oil, etc. associated with the fiber. The de-watering stage 181b separates the fiber by removing the wash water, and any protein washed from the fiber.

In this regard, in the rinsing stage 181a, wash water flows into chamber 174 from conduit line 48b and then is injected into the annular space 134 via at least one, and preferably a plurality of, nozzles 182. In one embodiment, for example, the nozzles 182 may be circumferentially spaced about the auger 114 at a fixed axial location (e.g., in a ring configuration). The nozzles 182 may be susceptible to plugging by fiber and it is for at least this reason that it is undesirable to have fiber present in chamber 174. The wash water injected into the annular space 134 in the washing zone 66b effectively washes the fiber. Additionally, the fiber is filtered from the wash water by moving the fiber/wash water mixture through the de-watering stage 181b. This allows the wash water and any additional protein, oil, etc. to pass through the screened side wall 82 of the basket 44 and drain into hopper 60b while the fiber is retained in the basket 44. As noted above, the fiber is subjected to a second rinsing/de-watering cycle 181a, 181b in the first washing zone 66b. At the end of the first washing zone 66b, the fiber has been washed and filtered (e.g., twice) such that it may have approximately the same concentration of water as at the end of the pre-concentration zone 66a (e.g., between about 55% and about 75% water). Depending on the amount of water added in the first washing zone 66b and the particular configuration of the filtration centrifuge 40, it may be possible to further reduce the water concentration of the fiber while still providing effective washing.

After the first washing zone 66b, the threads 130 of the auger 114 continue to move the fiber along the length of the filtration centrifuge 40 and into the second washing zone 66c having rinsing/de-watering stages 189a, 189b. In reference to FIGS. 3 and 7-9, wash water is supplied to the inlet 154 of the second water conduit 48c so as to flow through the outlet 156 and into a chamber 184 generally associated with the second washing zone 66c. The chamber 184 is bounded on one side by the conical member 176 and bounded on the opposite side by plate 186. Wash water flows into chamber 184 from conduit line 48c and then is injected into the annular space 134 via at least one, and preferably a plurality of, nozzles 188, which may be similar to nozzles 182. The wash water injected into the annular space 134 in the washing zone 66c effectively washes the fiber. Additionally, the fiber is filtered from the wash water by moving the fiber/wash water mixture through the de-watering stage 189b. This allows the wash water and any additional protein, oil, etc. to pass through the screened side wall 82 of the basket 44 and drain into hopper 60c while the fiber is retained in the basket 44. As noted above, the fiber is subjected to a second rinsing/de-watering cycle 189a, 189b in the second washing zone 66c. At the end of the second washing zone 66c, the fiber has been washed and filtered such that it may have approximately the same concentration of water as at the end of the pre-concentration zone 66a. As noted above, however, it may be possible to reduce the water concentration in the second washing zone 66c.

The washed and filtered fiber exits adjacent the second end 78 of the basket 44 and flows into the exit chute 70 and to outlet 72. When the fiber exits the chute 70, the fiber can be further processed as discussed further below to result in a desired product, such as DWGS or DDGS. In one example, the fiber can be transported to a remote site for further processing. Moreover, the slurry, which includes water, protein, oil, etc. that passes through the screened side wall 82 in the pre-concentration zone 66a, as well as the wash water, protein, oil, etc. that passes through the screened side wall 82 in the washing zones 66b, 66c are collected to define the thin stillage then transported and further processed as described below. Optionally, a portion of the slurry and/or wash water collected in washing zones 66a, 66b, and/or 66c may be piped back to the optional paddle screen 34 for further reprocessing.

In one aspect in accordance with various embodiments, the wash water for the washing zones 66b, 66c may implement counter current washing methodologies. For example, clean wash water may be supplied to the last washing zone 66c via the inlet 154 of second water conduit 48c. The wash water that is collected by hopper 60c, which may include water, protein, oil, etc., is then directed through outlet 62c and supplied to the inlet 150 of the first water conduit 48b. This once used wash water is then used to wash the fiber in the first washing zone 66a. The wash water that is collected by hopper 60b may then be combined with the slurry (minus the collected fiber) collected in hopper 60a and passed to the next step in the corn dry mill process as the thin stillage. Those of ordinary skill in the art will recognize how to implement the counter current washing methodology when there are additional washing zones or other zones in the filtration centrifuge 40.

In a further aspect in accordance with various embodiments, filtration centrifuge 40 may be configured to include an air blowing zone. Such an air blowing zone is adapted to further dry the fiber (e.g., reduce the water concentration of the fiber) by blowing hot air (or other suitable fluid) over the fiber. In this regard, a hot air source may be in fluid communication with the annular space 134 adjacent the second end 78 of the basket 44, such as with appropriate conduits. The hot air may be supplied to the filtration centrifuge 40 via its second end, for example. The hot air may be introduced into the fiber during, for example, the de-watering stage of the last washing zone 66c. Alternatively, a separate stage may be added to filtration centrifuge 40 for the purpose of drying the fiber using hot air or other suitable fluids.

In another aspect in accordance with various embodiments, filtration centrifuge 40 may include an adjustable brush assembly adapted to improve the filtration rate and re-generate the filtration surface along the screened side wall 82 of the basket 44. In this regard, the auger 114, and more particularly, the outer edge 132 of the threads 130 may include a brush (not shown) for sweeping across the screened side wall 82 of the basket 44. The brush may be used, for example, when the material being filtered has a size on the order of the gap between the outer edge 132 of the threads 130 and the inner surface of the side wall 82 of the basket 44. In such applications, the brush may extend across the gap so as to loosen the material from the screened side wall 82 and thus prevent or reduce plugging, as well as to facilitate movement of the material along the centrifuge.

The features of the filtration centrifuge 40, including, for example, the multi-flight design of the threads 130 of the auger 114, the conical shape of the basket 44 in the pre-concentration zone 66a, the relatively large L/D ratio at which the centrifuge is capable of operating, and/or other features allows the filtration centrifuge 40 to have a compact design. In this regard, one or more of the features allows the filtration centrifuge 40 to be a single, self-contained device that performs both the initial filtering of the liquid medium to remove the desired filtered material, and washing of the material to remove additional constituents, such as additional protein, oil, etc. therefrom.

The ability of filtration centrifuge 40 to more effectively "dry" (i.e., reduce the concentration of water in the filtered material) in the pre-concentration zone 66a, in turn, allows the use of such displacement washing techniques. If the concentration of water in the filtered material is too high (as in conventional systems) displacement washing techniques may not prove beneficial and as a result, less-effective dilution washing techniques are implemented. In addition to the above, the filtration centrifuge 40 may be made more compactly and therefore utilize floor space within a manufacturing facility in a more efficient manner than present systems. Moreover, such a design may also reduce the capital costs of the device, the labor and associated costs for maintaining the device, and the operating costs (e.g., use less water, etc.).

Furthermore, one or more of the features of filtration centrifuge 40 allows the filtered material to exit the centrifuge in a "dryer" condition as compared to existing filtration systems. Heretofore, such filtering has been typically achieved by a decanter centrifuge. For example, filtration centrifuge 40 may provide the filtered material at a water concentration of between about 55% and about 75% water, which is a significant reduction compared to conventional filtration systems. Providing a dryer product may result in additional benefits. Additionally, energy costs associated with operation of a dryer is also expensive. Significant energy savings may be achieved by having just a relatively small change in the concentration of water in the material. Alternatively, depending on the application, the dryer step may be omitted in the post processing of the fiber. Thus, the ability of filtration centrifuge 40 to provide a dryer material may allow manufacturers to forego or reduce the costs associated with these post processing steps.

In addition, one or more of the features results in the filtration centrifuge 40 being flexible and robust in use. For example, it is believed that filtration centrifuge 40 is capable of effectively functioning over a wide range of operating parameters. For example, filtration centrifuge 40 is capable of effectively accommodating a broad range of materials for filtering (e.g., fiber), a broad range of material sizes, as well as material that may be sharp or otherwise difficult to handle. In addition, the filtration centrifuge 40 is capable of accommodating an input slurry or feed having a wide concentration range (i.e., the filtration centrifuge 40 is generally not sensitive to the concentration of the input material).

Figure 10:
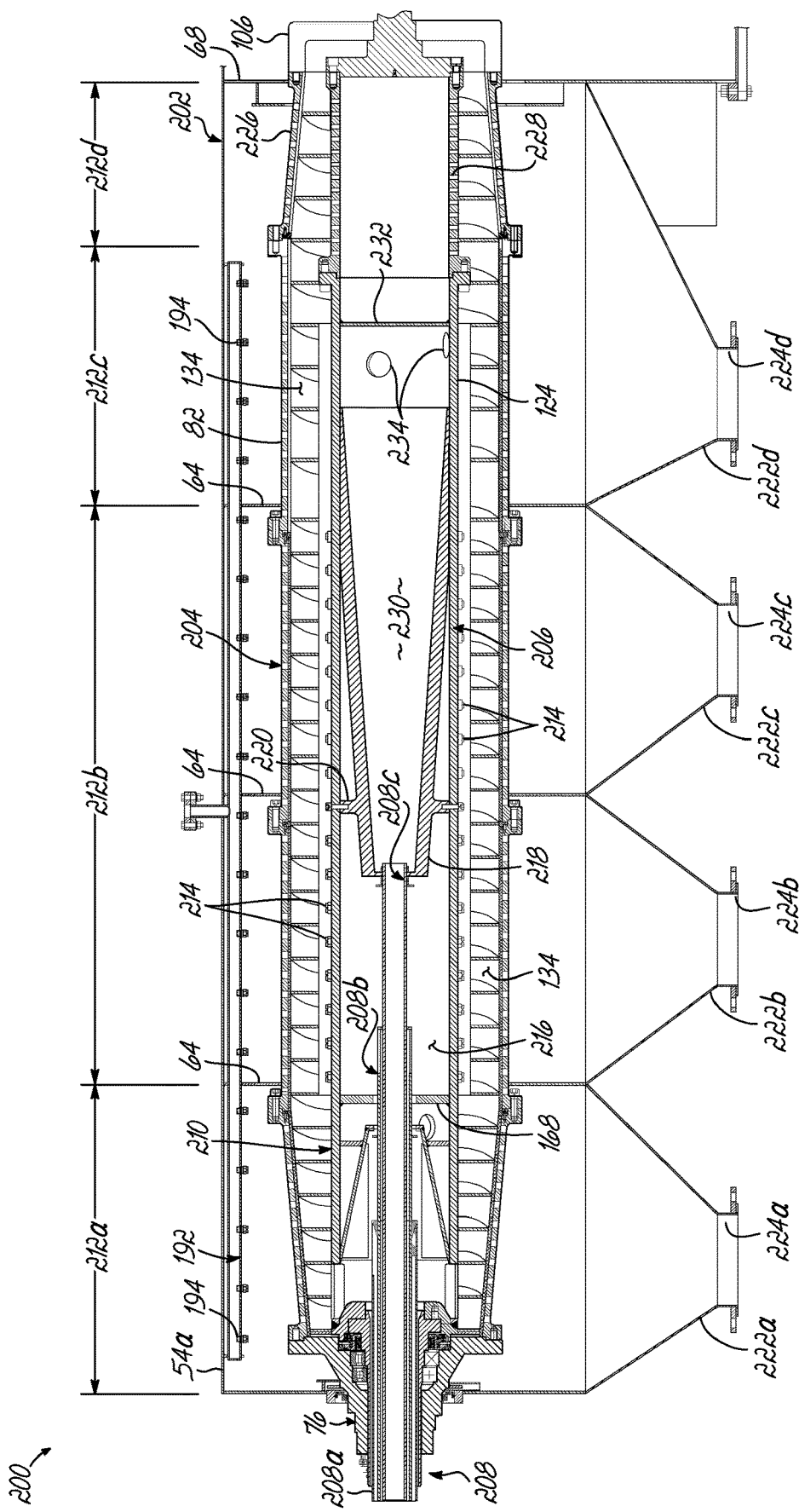
FIG. 10 is a cross-sectional view of a filtration centrifuge in accordance with another embodiment of the invention.

Another embodiment of a filtration centrifuge is shown in FIG. 10. Filtration centrifuge 200 is structurally and operationally similar to filtration centrifuge 40 shown and described above. Accordingly, a detailed description of the filtration centrifuge 200 is not deemed necessary. Instead, a detailed description of the modifications between the filtration centrifuges 40, 200 will be provided. Similar reference numbers in FIG. 10 will refer to like features shown in FIGS. 3-9. Filtration centrifuge 200 includes an outer housing 202, an inner housing or basket 204, a conveyor 206 generally coaxially disposed in the basket 204, and a plurality of conduit lines 208 generally coaxially disposed in conveyor 206. The plurality of conduit lines 208 include one slurry supply line 208a and two wash water supply lines 208b, 208c. The conveyor 206 may be configured as an auger 210 similar to that described above.

One modification is directed to the number and/or types of zones provided in filtration centrifuge 200. For example, and as explained in more detail below, filtration centrifuge 200 may include a pre-concentration zone 212a, a washing zone 212b, a de-watering zone 212c, and a compaction zone 212d. The pre-concentration zone 212a is similar to that described above in terms of the configuration and operation of the conduit lines 208, auger 210, basket 204, and housing 202 along with the pre-concentration zone 212a, which includes corresponding funnel-shaped hopper 222a and outlet 224a, and thus, a further description will not be provided herein. The washing zone 212b, however, has been modified. In regard to filtration centrifuge 40, each of the washing stages 66b, 66c included two rinsing/de-watering cycles spaced axially along the central axis 90 of filtration centrifuge. As shown in FIG. 10, after the pre-concentration zone 212a, there is only one washing zone 212b. Moreover, instead of one or more rinsing/de-watering cycles axially spaced along the centrifuge, auger 210 includes a plurality of nozzles 214 generally uniformly axially and circumferentially spaced along washing zone 212b. Such an arrangement provides a relatively uniform injection of wash water into washing zone 212b. In essence, the washing zone 212b becomes a rinse cycle without a corresponding de-watering cycle. Those of ordinary skill in the art should recognize that fluid (e.g., water, protein, oil, etc) will be ejected from the basket 204 due to the centrifugal forces acting on the material. However, this occurs at locations where a relatively large amount of wash water is being introduced (by nozzles 214). In contrast, de-watering occurs when no wash water or alternatively, a relative small amount of fluid is being introduced.

One modification is directed to the number and/or types of zones provided in filtration centrifuge 200. For example, and as explained in more detail below, filtration centrifuge 200 may include a pre-concentration zone 212a, a washing zone 212b, a de-watering zone 212c, and a compaction zone 212d. The pre-concentration zone 212a is similar to that described above in terms of the configuration and operation of the conduit lines 208, auger 210, basket 204, and housing 202 along the pre-concentration zone 212a and thus, a further description will not be provided herein. The washing zone 212b, however, has been modified. In regard to filtration centrifuge 40, each of the washing stages 66b, 66c included two rinsing/de-watering cycles spaced axially along the central axis 90 of filtration centrifuge. As shown in FIG. 10, after the pre-concentration zone 212a, there is only one washing zone 212b. Moreover, instead of one or more rinsing/de-watering cycles axially spaced along the centrifuge, auger 210 includes a plurality of nozzles 214 generally uniformly axially and circumferentially spaced along washing zone 212b. Such an arrangement provides a relatively uniform injection of wash water into washing zone 212b. In essence, the washing zone 212b becomes a rinse cycle without a corresponding de-watering cycle. Those of ordinary skill in the art should recognize that fluid (e.g., water, protein, oil, etc) will be ejected from the basket 204 due to the centrifugal forces acting on the material. However, this occurs at locations where a relatively large amount of wash water is being introduced (by nozzles 214). In contrast, de-watering occurs when no wash water or alternatively, a relative small amount of fluid is being introduced.

In operation, wash water is supplied to the first water conduit 208b so as to flow through its outlet and into a chamber 216 in auger 210 generally associated with the washing zone 212b. The chamber 216 is bounded on one side by baffle plate 168 and bounded on the opposite side by a conical member 218. The conical member 218 includes a gapped or webbed support member 220 that allows wash water to flow thereby. The wash water in chamber 216 is injected into the annular space 134 via the nozzles 214 to wash the fiber and remove any remaining protein, oil, etc. that may be associated with the fiber after the initial pre-concentration zone 212a. In the washing zone 212b, wash water having a first concentration of constituents (e.g., protein) is injected and water having a second concentration of constituents, which is higher than the first concentration, is ejected from the side wall 82 of basket 204. This fluid drains into one or more hoppers 222b, 222c and through respective outlets 224b, 224c. While two hoppers 222b, 222c may be associated with washing zone 212b, those of ordinary skill in the art will recognize that only one hopper may be provided for the washing zone 212b. When washing zones get relatively long, there may be some advantages with having multiple hoppers within a single washing zone. For example, the counter-current washing technique may be more effective using multiple hoppers. The invention should not be limited to having one hopper per zone, but those of ordinary skill will recognize that the number of hoppers (and/or compartments defined by interior panels 64) may vary depending on the particular application.

After the washing zone 212b, the threads 130 of auger 210 move the fiber along the filtration centrifuge 200 and into a de-watering zone 212c. The de-watering zone 212c is configured to remove the wash water and any additional protein, oil, etc. from the fiber, but with little to no addition of more wash water (e.g., there is no wash water injected into the annular space 134 along the de-watering zone 212c via injection nozzles). Along the de-watering zone 212c, the water, protein, oil, etc. that pass through the screened side wall 82 of basket 204 drains into hopper 222d with the fiber being retained in the basket 204. Thus, the concentration of water in the filtered material may be reduced in the de-watering zone 212c.

Another modification in this embodiment is the inclusion of a compaction zone 212d in filtration apparatus 200. In this regard, the basket diameter Db may vary along the length of the basket 204 adjacent the second end thereof. By way of example, basket 204 may include a third basket section 226 adjacent the second end 78 of the basket. The third basket section 226 may include a generally inwardly tapered (i.e., converging) or cone-shaped configuration in a direction from first end 74 toward second end 78. In one embodiment, the third basket section 226 may extend for about 10% to about 30% of the length of the basket 204, and may substantially correspond in length to the compaction zone 212d of the filtration centrifuge 200. It is believed that the conical shape of the basket 204 along this portion essentially compacts the filtered material (e.g., fiber) due to a reduced cross-sectional area (and therefore volume) along this region. The water, protein, oil, etc. that pass through the screened side wall 82 of basket 204 in the compaction zone 212d drains into hopper 222d and through outlet 224d. This compaction further reduces the concentration of water in the filtered material resulting in dryer fiber being output from the filtration centrifuge 200. The cone angle in the third basket section 226 may be selected based on the specific application and/or other factors including, for example, desired cake thickness or other desired aspects of the fiber or constituents removed with the water through the side wall 82.

In one embodiment, an additional pathway for water to escape as a result of the squeezing of the filtered material may be provided in the compaction zone 212d. In this regard, the auger 210 may have side wall 124 configured as a screen 228 for at least a portion of the length of the compaction zone 212d. In this way, it is possible for fluid to escape not only through the screened side wall 82 of basket 204, but also through the side wall 124 of the auger 210 along at least a portion of this zone. As discussed in more detail below, the fluid which passes through the screen 228 may be directed into the annular space 134 in the de-watering zone 212c. Alternatively, the fluid may be removed from auger 210 through other means such as a drain conduit through the second end of filtration centrifuge 200.

In still a further embodiment, and referring back to FIG. 1, to release starch, germ (oil), protein, fiber and other constituents from corn, the corn goes through a grinding process. Such grinding process(es) can result in some amount of a specific constituent being ground to relatively fine particles (e.g., less than about 50 microns). For example, relatively small pieces of fiber, referred to in the industry as fine fiber, are typically produced therefrom. Thus, while a relatively high percentage of the fiber does not get ground into very small particles, some relatively small percentage of the fiber may be ground into small particles. Sufficiently small constituent particles may still reside in the whole stillage byproduct. Fiber having a size less than that of the screen of the filtration centrifuge 40 may pass through and to subsequent steps of the corn dry mill process. In this regard and in accordance with an aspect of the invention, the fiber collected in basket 204 may in essence be used as a filtering medium for fine fiber. More particularly, the fiber in basket 204 near the second end 78 thereof is relatively thick (e.g., between about 55% and about 75% water) and thus effectively comprises a relatively tight network of fibers that, in essence, collectively forms a matted material. This matted network of fibers collected in basket 204 may be used as a "filter" to separate the fine fiber from a liquid medium. To this end, it is believed that the network of fibers may include voids or openings that are smaller than the fine fiber thereby trapping the fine fiber within the network of fibers already collected in basket 204.

To configure filtration centrifuge 200 for such a purpose, the slurry carrying the fine fiber (e.g., the output from pre-concentration zone 212a) may be supplied to the second water conduit 208c, the exit of which is within a chamber 230 generally associated with the de-watering zone 212c. The chamber 230 is bounded on one side by the conical member 218 and bounded on the opposite side by plate 232. The auger 210 includes one or more apertures 234 that provide fluid communication between chamber 230 and the annular space 134. The slurry with the fine fiber flows into chamber 230 from conduit line 208c and then flows into annular space 134 via the apertures 234. Due to the forces imposed by rotation of the basket 204 and/or auger 210, the liquid medium which carries the fine fiber flows through the matted fibers already collected in basket 204, flows through the side wall 82 of basket 204, and drains into the hopper 222d. It is believed that the fluid collected in hopper 222d has a significantly reduced amount of fine fiber therein. Moreover, the fine fiber may be filtered from the liquid medium using the same apparatus that performs the initial filtration for the large pieces and washing of the fiber. This significantly reduces the costs, maintenance, etc. that is associated with conventional apparatus for filtering fine fiber. With the fine fiber removed from the liquid medium, the thin stillage may be transported for further processing in the corn dry mill process.

Additional advantages and modifications will readily appear to those skilled in the art. For example, while the filtration centrifuges 40, 200 have been described herein as being in a generally horizontal orientation, other orientations are possible, including the centrifuges having a generally vertical orientation. Additionally, the centrifuges 40, 200 may be an open type of system or configured for closed operation. The filtration centrifuges 40, 200 may also be designed for pressurized operation. Still further, the filtration centrifuges 40, 200 may be operated continuously or configured to work in a batch mode of operation. As illustrated in FIGS. 3 and 10, the filtration centrifuges 40, 200 may include a basket cleaning system 192, including a plurality of nozzles 194 situated, for example, along the upper wall 54a of the outer housing 42, 202, respectively. The basket cleaning system 192 provides backwashing for cleaning the baskets 44, 204. Furthermore, those of ordinary skill in the art should recognize that the number and types of zones may be selected based on the specific application. For example, a filtration centrifuge in accordance with an embodiment may include a pre-concentration zone without any washing zones. Such an embodiment may further include a de-watering zone, and/or a compaction zone, and/or an air blowing zone. Thus, the number and types of zones may be selected based on a specific application.

With further reference again to FIG. 2, although a single filtration centrifuge 40 is depicted, it should be understood that a plurality of filtration centrifuges 40 may be situated in-line and utilized for separating the whole stillage byproduct into its insoluble solids portion (fiber) and thin stillage portion. And in an alternate embodiment, it is contemplated that the filtration centrifuge 40 can be replaced by a standard pressure screen, decanter centrifuge, a paddle screen, or other like devices as are known in the art to separate the whole stillage byproduct into the insoluble solids portion and thin stillage portion then further processed as discussed below. One such suitable pressure screen is the PS-Triple available from Fluid-Quip, Inc. of Springfield, Ohio. One such suitable decanter centrifuge is the NX-944HS available from Alfa Laval of Lund, Sweden. And one such suitable paddle screen is the FQ-PS32 available from Fluid-Quip, Inc. of Springfield, Ohio.

As further shown in FIG. 2, the thin stillage underflow from the filtration centrifuge 40 is piped to join up with the underflow from the optional paddle screen 34. After which time, the thin stillage portion may be optionally subjected to a standard pressure screen 250, as is known in the art, to further aid in separation of any fine fiber from the thin stillage portion. As indicated above, fiber having a size less than that of the screen of the filtration centrifuge 40 and/or optional paddle screen 34 may pass through and to subsequent steps of the corn dry mill process. At the pressure screen 250, the separated fine fiber can be separated from the thin stillage and piped back to the filtration centrifuge 40 whereat the fine fiber may be filtered out. In one example, the matted network of fibers collected in basket 204 (FIG. 10) may be used as a "filter" to separate the fine fiber from a liquid medium, and further processed as discussed below. One such suitable pressure screen 250 is the PS-Triple available from Fluid-Quip, Inc. of Springfield, Ohio. In an alternate embodiment, the optional pressure screen 250 may be replaced with a standard paddle screen or decanter centrifuge, as are mentioned above, or other like device, to aid in separation of the fine fiber from the thin stillage portion.

After the optional pressure screen 250, the underflow or remaining thin stillage portion is then piped and subjected to a nozzle centrifuge 252, as is known in the art. The nozzle centrifuge 252 can be provided with washing capabilities so that fresh water, along with the thin stillage portion, can be supplied to the nozzle centrifuge 252. The additional fresh water allows for easier separation of the thin stillage into its protein portion and water soluble solids portion. The heavier protein portion separates from the water soluble solids portion and is removed as the underflow whereas the lighter water soluble solids portion, which includes oil, can be removed as the overflow. One such suitable nozzle centrifuge 252 is the FQC-950 available from Fluid-Quip, Inc. of Springfield, Ohio. In an alternate embodiment, the nozzle centrifuge 252 can be replaced with a standard cyclone apparatus or other like device, as are known in the art, to separate the thin stillage portion into the underflow protein portion and overflow water soluble solids portion. One such suitable cyclone apparatus is the RM-12-688 available from Fluid-Quip, Inc. of Springfield, Ohio.

The underflow protein portion from the nozzle centrifuge 252 is further piped and subjected to decanter centrifuge 254 to dewater the protein portion. The decanter centrifuge 254 is standard and known in the art. One such suitable decanter centrifuge 254 is the NX-944HS available from Alfa Laval of Lund, Sweden. Other like devices are contemplated. The separated water portion or filtrate from the decanter centrifuge 254 may be recycled back, for example, to the liquefaction step 16 or the fermentation step 20 for reuse in the dry mill process. The dewatered protein portion is then dried, such as by being sent to a dryer 256, as is known in the art. In an alternate embodiment, the dewatered protein portion can be subjected to vacuum filtration or other drying methods, as are known in the art. The final dried protein product defines a high protein corn meal that includes at least 40 wt % protein on a dry basis and which may be sold as pig or chicken feed, for example. In another embodiment, the high protein corn meal includes at least 45 wt % protein on a dry basis. In another embodiment, the high protein corn meal includes at least 50 wt % protein on a dry basis. In yet another embodiment, the high protein corn meal includes at least 60 wt % protein on a dry basis. In still another embodiment, the high protein corn meal includes about 56 wt % protein on a dry basis. The resulting high protein corn meal may be sold at a much higher cost per ton than DDGS or DWGS.

With continuing reference to FIG. 2, the overflow water soluble solids portion, which includes oil as well as minerals and soluble proteins, is piped from the nozzle centrifuge 252 and subjected to a set of three evaporators 260a, 260b, and 260c, as are known in the art, to begin separating the soluble solids from the water soluble solids portion. The evaporators 260a-c evaporate the liquid portion of the water soluble solids portion. Thereafter, the water soluble solids portion can be piped and subjected to an optional oil recovery centrifuge 261, as is known in the art, so that oil can be removed therefrom. One such suitable oil recovery centrifuge 261 is the ORPX 617 available from Alfa Laval of Lund, Sweden. In one example, the final recovered oil product can include between about 40 wt % to about 60 wt % of the total corn oil in the corn. In comparison to typical oil recovery in a standard dry mill process, oil recovery centrifuge 261 can function at a higher capacity because the water soluble solids portion, which is subjected to the oil recovery centrifuge 261, includes less liquid and less protein than normal.

The remainder of the water soluble solids portion can be piped and subjected to another set of three evaporators 260d, 260e, and 260f whereat the liquid portion is further evaporated from the water soluble solids portion to ultimately yield a soluble solids portion. While the water soluble solids portion is subjected to two sets of three evaporators 260a-c, 260d-f, it should be understood that the number of evaporators and sets thereof can be varied, i.e., can be more or less, from that shown depending on the particular application and result desired.

The resulting soluble solids portion may be combined with the insoluble solids portion, e.g., fiber, received from the filtration centrifuge 40 to provide distillers wet grains with soluble (DWGS), which may be further dried by a drier 262, as is known in the art, to provide distillers dry grains with solubles (DDGS), both of which can be sold to dairy and beef feedlots. In another example, the soluble solids portion may be used as a natural fertilizer.

Accordingly, in this dry mill process, neither the DDGS nor DWGS receive the typical concentrated syrup from the evaporators 260. While this change from the typical dry mill process 10 results in a lower crude protein content in the DDGS and DWGS, this decrease is insubstantial, particularly, when the economic advantages of producing the high protein corn meal are realized. And, despite the lower protein content, the DDGS and DWGS may still be sold to beef and dairy feedlots as cattle feed.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for producing a grain meal from a whole stillage byproduct comprising:
   separating the whole stillage byproduct into a wet cake portion and a thin stillage portion, which includes protein;
   prior to any evaporation step, separating out a solids portion, including the protein, from the thin stillage portion, wherein the solids portion, including the protein, is not subsequently subjected to an evaporator; and
   drying the solids portion, including the protein, to define a grain meal that includes at least 40 wt % protein on a dry basis.

2. The method of claim 1 wherein separating the whole stillage byproduct into a wet cake portion and a thin stillage portion, which includes protein, comprises in a grain dry-milling process for making alcohol, separating the whole stillage byproduct into a wet cake portion and a thin stillage portion, which includes protein.

3. The method of claim 2 wherein the alcohol is ethanol.

4. The method of claim 1 wherein separating out the solids portion, including the protein, from the thin stillage portion comprises separating out, via weights, the solids portion, including the protein, from the thin stillage portion, wherein the solids portion, including the protein, is not subsequently subjected to an evaporator.

5. The method of claim 1 wherein drying the solids portion, including the protein, to define a grain meal that includes at least 40 wt % protein on a dry basis comprises drying the solids portion, including the protein, via a dryer to define a grain meal that includes at least 40 wt % protein on a dry basis.

6. The method of claim 1 further comprising dewatering the solids portion, including the protein, followed by drying the dewatered solids portion, including the protein, to define the grain meal.

7. The method of claim 1 wherein separating the whole stillage byproduct into a wet cake portion and a thin stillage portion includes subjecting the whole stillage byproduct to a filtration centrifuge, a decanter centrifuge, a pressure screen, or a paddle screen to separate the whole stillage byproduct into the wet cake portion and the thin stillage portion.

8. The method of claim 1 wherein the grain meal includes at least 45 wt % protein on a dry basis.

9. The method of claim 1 wherein the grain meal includes at least 50 wt % protein on a dry basis.

10. The method of claim 1 further comprising, after separating the whole stillage byproduct into a wet cake portion and a thin stillage portion and before separating out the solids portion, including the protein, from the thin stillage portion, separating out fine fiber from the thin stillage portion.

11. The method of claim 10 further comprising recovering the fine fiber.

12. The method of claim 1 wherein separating out the solids portion, including the protein, from the thin stillage portion includes subjecting the thin stillage portion to a nozzle centrifuge or a cyclone apparatus to separate out the solids portion, including the protein, from the thin stillage portion.

13. The method of claim 1 further comprising drying the wet cake portion, which includes fiber.

14. The method of claim 1 further comprising transporting the wet cake portion, which includes fiber, to a remote site.

15. The method of claim 1 for producing a corn meal from the whole stillage byproduct and wherein drying the solids portion comprises drying the solids portion, including the protein, to define a corn meal that includes at least 40 wt % protein on a dry basis.

16. The method of claim 1 wherein separating the whole stillage byproduct into a wet cake portion and a thin stillage portion, which includes protein, comprises filtering the thin stillage portion from the wet cake portion, which includes fiber, followed by separating additional protein from the wet cake portion.

17. The method of claim 1 wherein separating the whole stillage byproduct into a wet cake portion and a thin stillage portion, which includes protein, comprises filtering the thin stillage portion from the wet cake portion, which includes fiber, followed by washing the wet cake portion then dewatering the washed wet cake portion to remove protein therefrom.

18. The method of claim 17 wherein the thin stillage portion includes the removed protein from the dewatered wet cake portion.

19. The method of claim 17 further comprising drying the dewatered wet cake portion.

20. A system for producing grain meal from a whole stillage byproduct, the system comprising:
   a first apparatus that receives a whole stillage byproduct, wherein the first apparatus separates the whole stillage byproduct into a wet cake portion and a thin stillage portion, which includes protein;
   a second apparatus that is situated after the first apparatus and prior to any evaporator and that receives the thin stillage from the first apparatus, wherein the second apparatus separates out a solids portion, including the protein, from the thin stillage portion; and
   an evaporator that is situated after the second apparatus and that receives the remaining thin stillage portion but does not receive the separated solids portion, including the protein, wherein the evaporator separates soluble solids from the remaining thin stillage portion, via evaporation, and wherein the separated solids portion, including the protein, defines a grain meal that includes at least 40 wt % protein on a dry basis.

21. The system of claim 20 further comprising a dryer that is situated after the second apparatus and that dries the separated out solids portion, including the protein, to define the grain meal that includes at least 40 wt % protein on a dry basis.

22. The system of claim 20 wherein the first apparatus is situated after a distillation column and receives the whole stillage byproduct produced via a grain dry-milling process.

23. The system of claim 20 wherein the second apparatus separates out, via weights, the solids portion, including the protein, from the thin stillage portion.

24. The system of claim 20 wherein the first apparatus is selected from a filtration centrifuge, a decanter centrifuge, a pressure screen, or a paddle screen and the second apparatus is selected from a nozzle centrifuge or a cyclone apparatus.

25. The system of claim 20 further comprising a second dryer that receives and dries the separated wet cake portion, which includes fiber.

26. The system of claim 20 for producing a corn meal from the whole stillage byproduct and wherein the separated solids portion, including the protein, defines a corn meal that includes at least 40 wt % protein on a dry basis.

* * * * *